United States Patent [19]

Mahin

[11] 4,258,979
[45] Mar. 31, 1981

[54] REAR VIEW MIRROR ASSEMBLY

[76] Inventor: William E. Mahin, 155 Ashland Acres Rd., Ashland, Oreg. 97520

[21] Appl. No.: 967,601

[22] Filed: Dec. 8, 1978

[51] Int. Cl.³ ............................................. G02B 5/10
[52] U.S. Cl. .................................... 350/293; 350/303
[58] Field of Search ................................. 350/293, 303

[56] References Cited

U.S. PATENT DOCUMENTS 4,012,125  3/1977  Hart ................................. 350/293 X

FOREIGN PATENT DOCUMENTS 1921076  11/1970  Fed. Rep. of Germany ........... 350/293
2031824  1/1971   Fed. Rep. of Germany ........... 350/293
1939756  2/1971   Fed. Rep. of Germany ........... 350/293
1947956  4/1971   Fed. Rep. of Germany ........... 350/303
2415270  10/1975  Fed. Rep. of Germany ........... 350/293

Primary Examiner—F. L. Evans
Attorney, Agent, or Firm—Flehr, Hohbach, Test

[57] ABSTRACT

A rear view mirror assembly mounted to one side of a given vehicle is disclosed herein and includes a mirrored surface supported in a fixed position relative to a predetermined observation point for viewing a second trailing vehicle. This mirrored surface includes a first segment horizontally and/or vertically curved in accordance with changing magnification ratios, preferably in a way which defines a substantially linear relationship between the position of the trailing vehicle and the horizontal and/or vertical position of its image on the curved surface segment. In this way, as the trailing vehicle approaches the lead vehicle from behind, horizontal and/or vertical movement of its image across the curved segment is controlled, preferably to a speed linearly proportionate to the speed of the trailing vehicle relative to the lead vehicle. At the same time, the mirrored surface provides a view incorporating the rear section of the lead vehicle including its rear tires on the mirror supported side.

28 Claims, 19 Drawing Figures

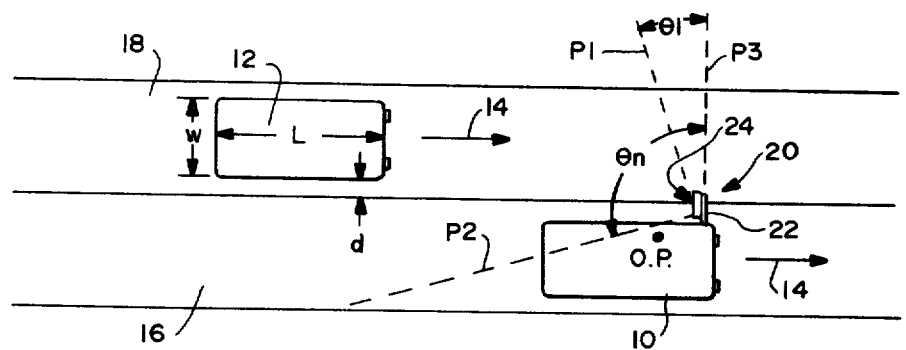
FIG.—1
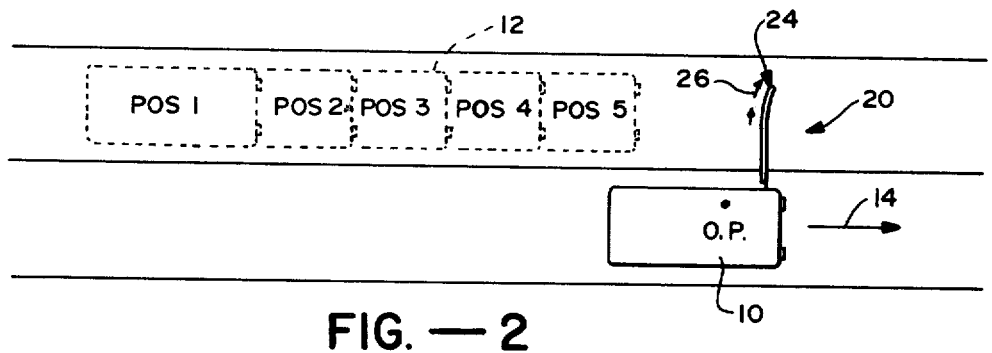
FIG.—2
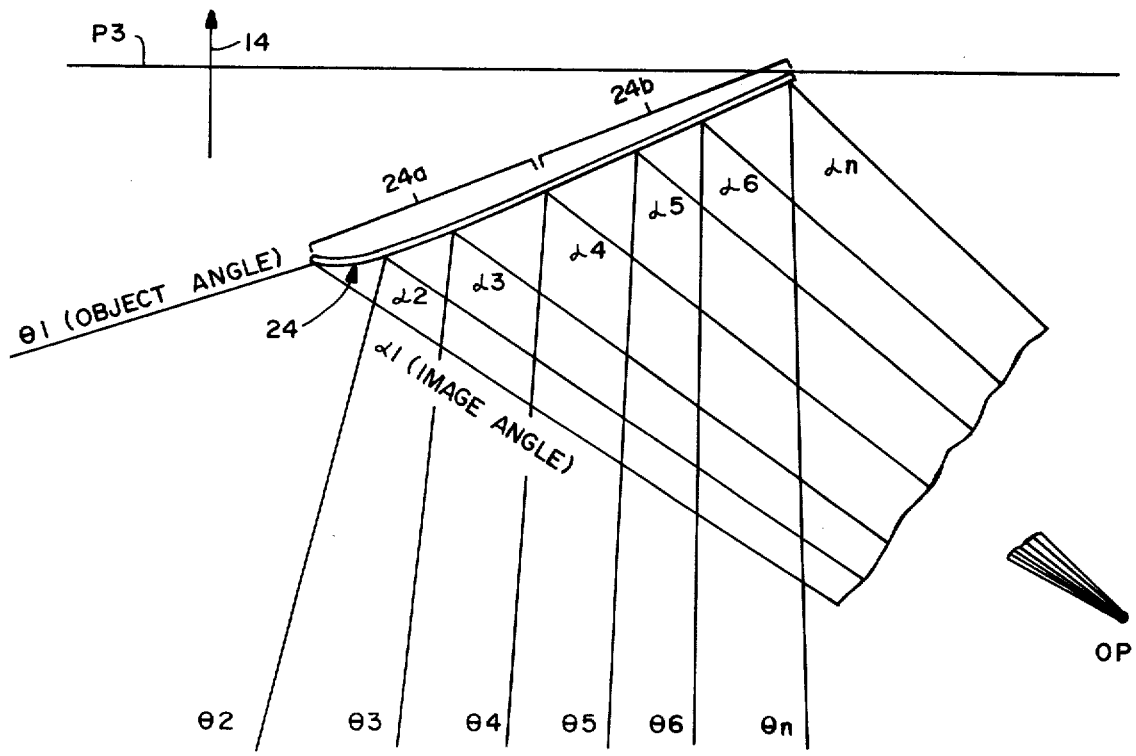
FIG.—3

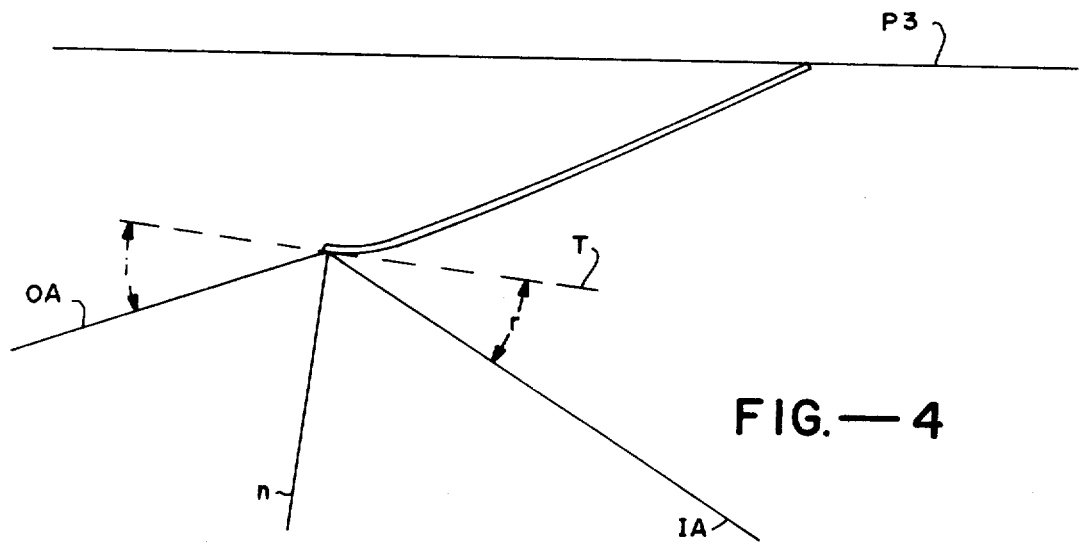
FIG.—4
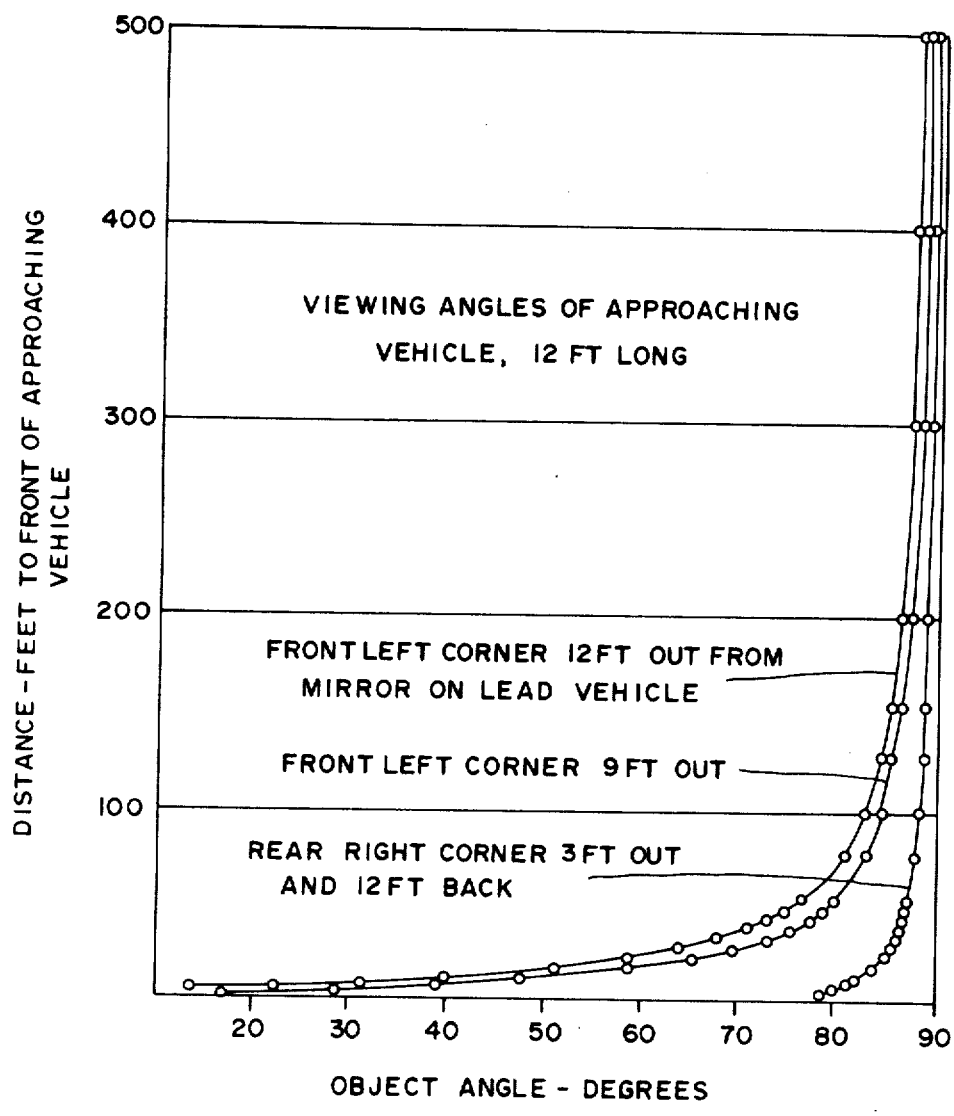
FIG.—5

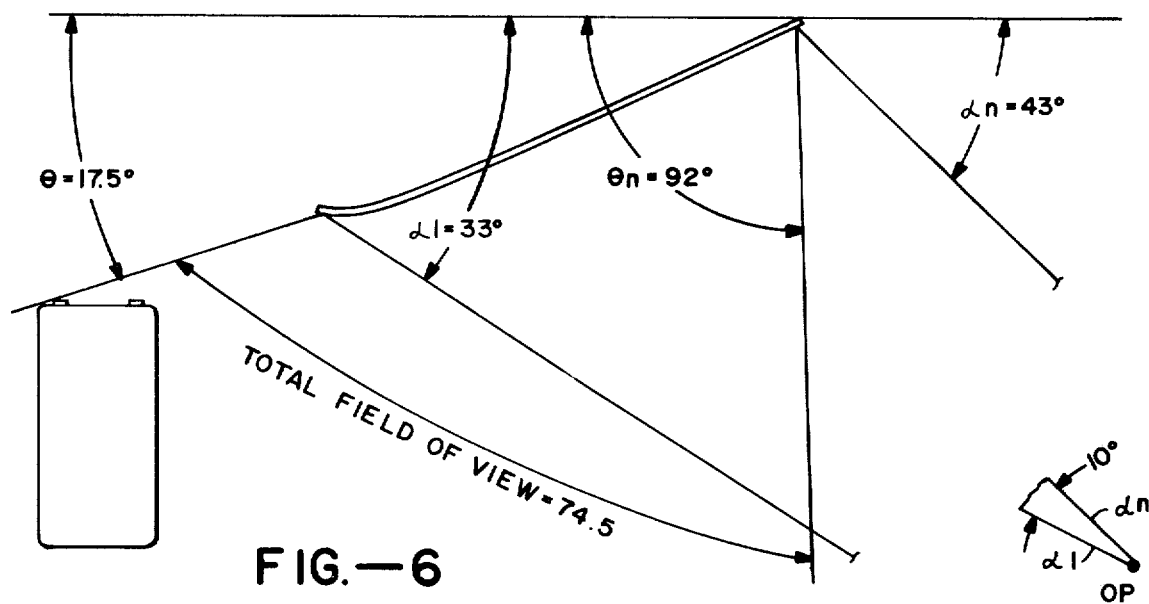
FIG.—6
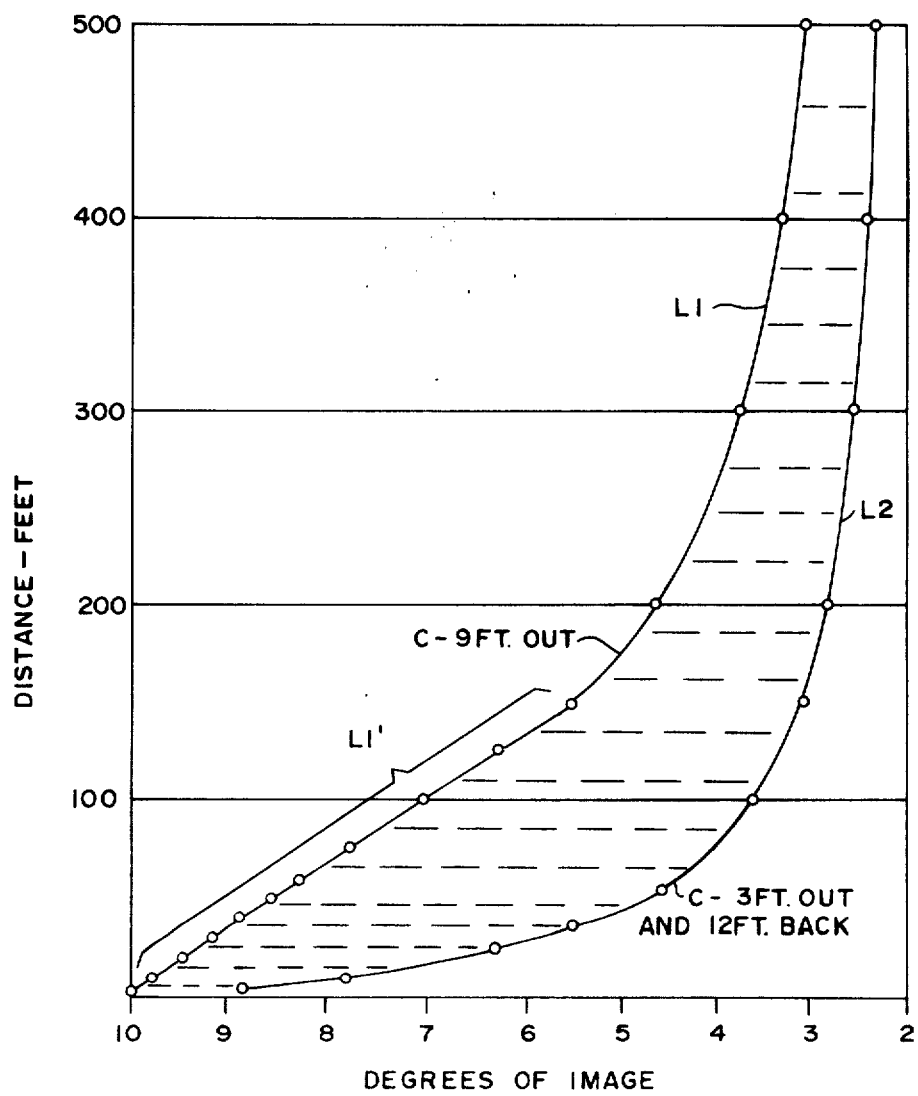
FIG.—7b

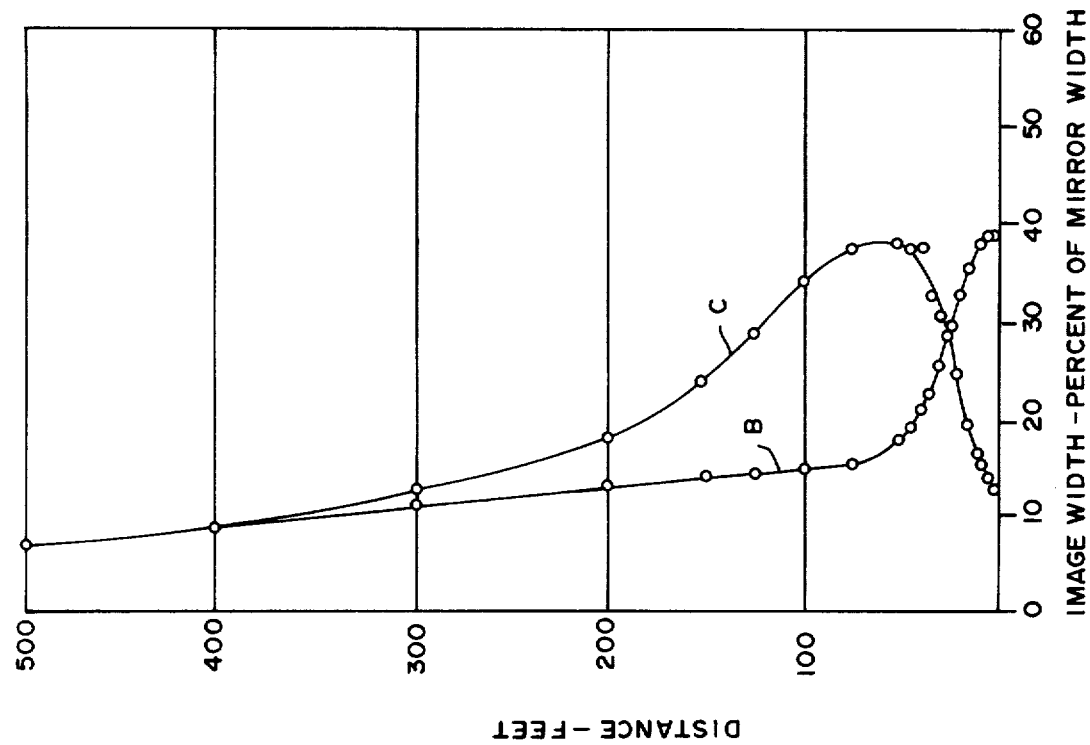
FIG.—7c
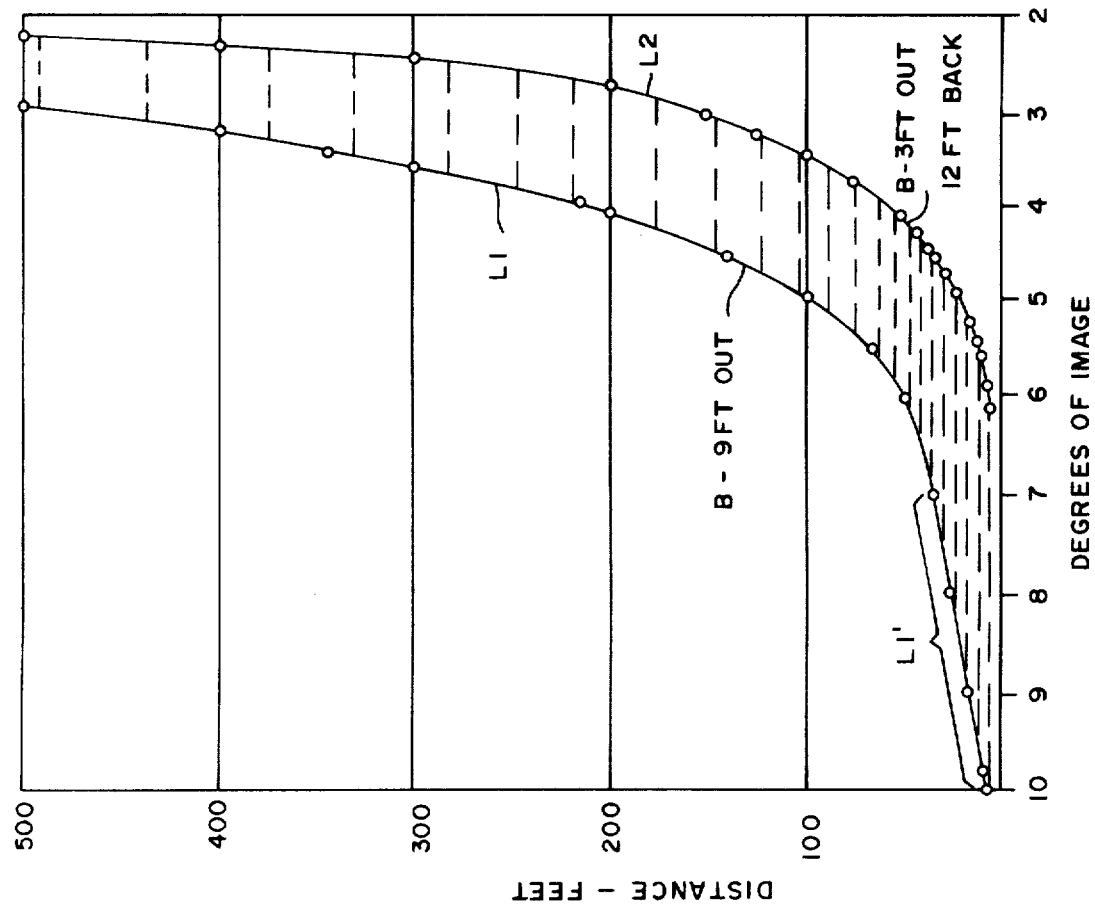
FIG.—7a

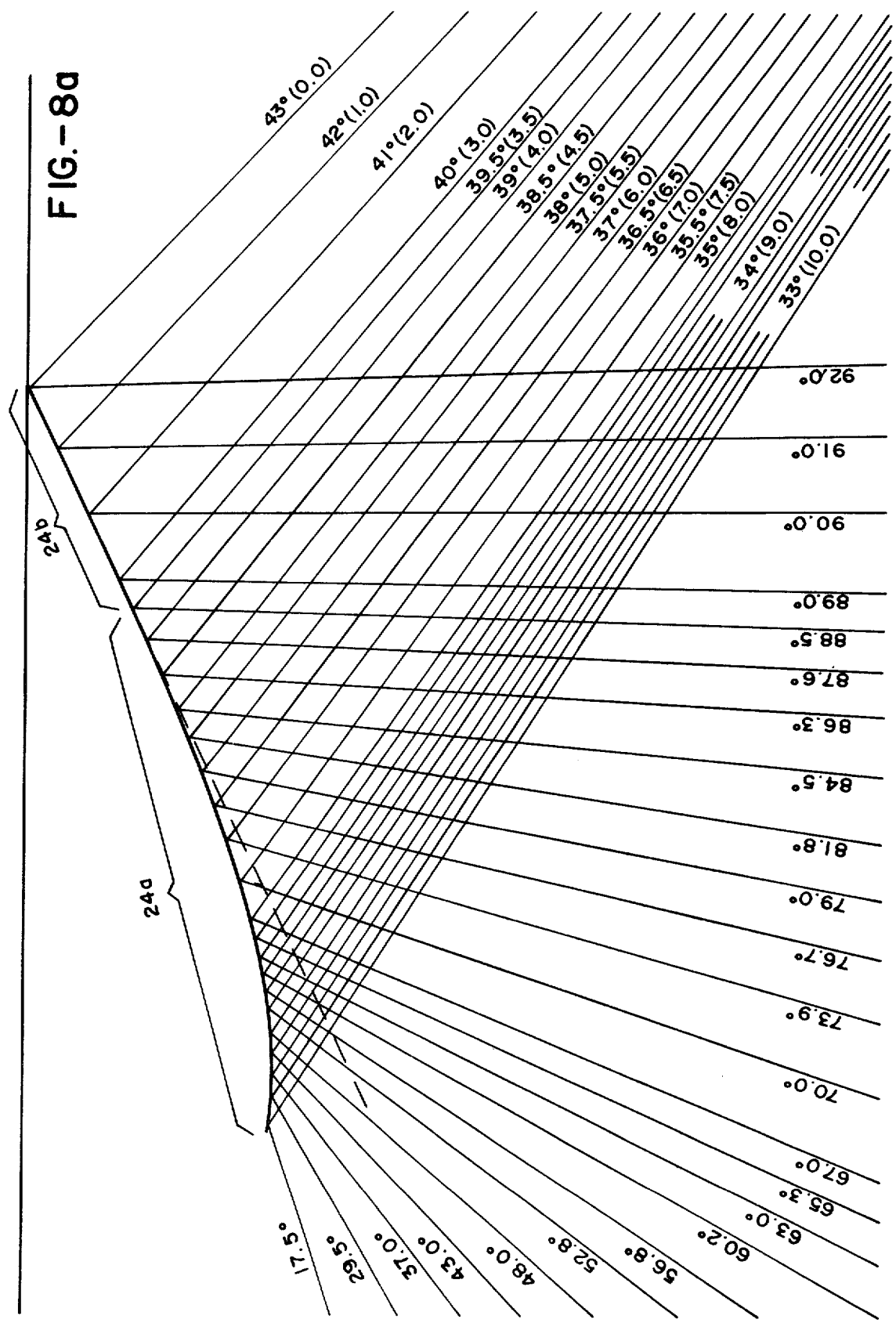

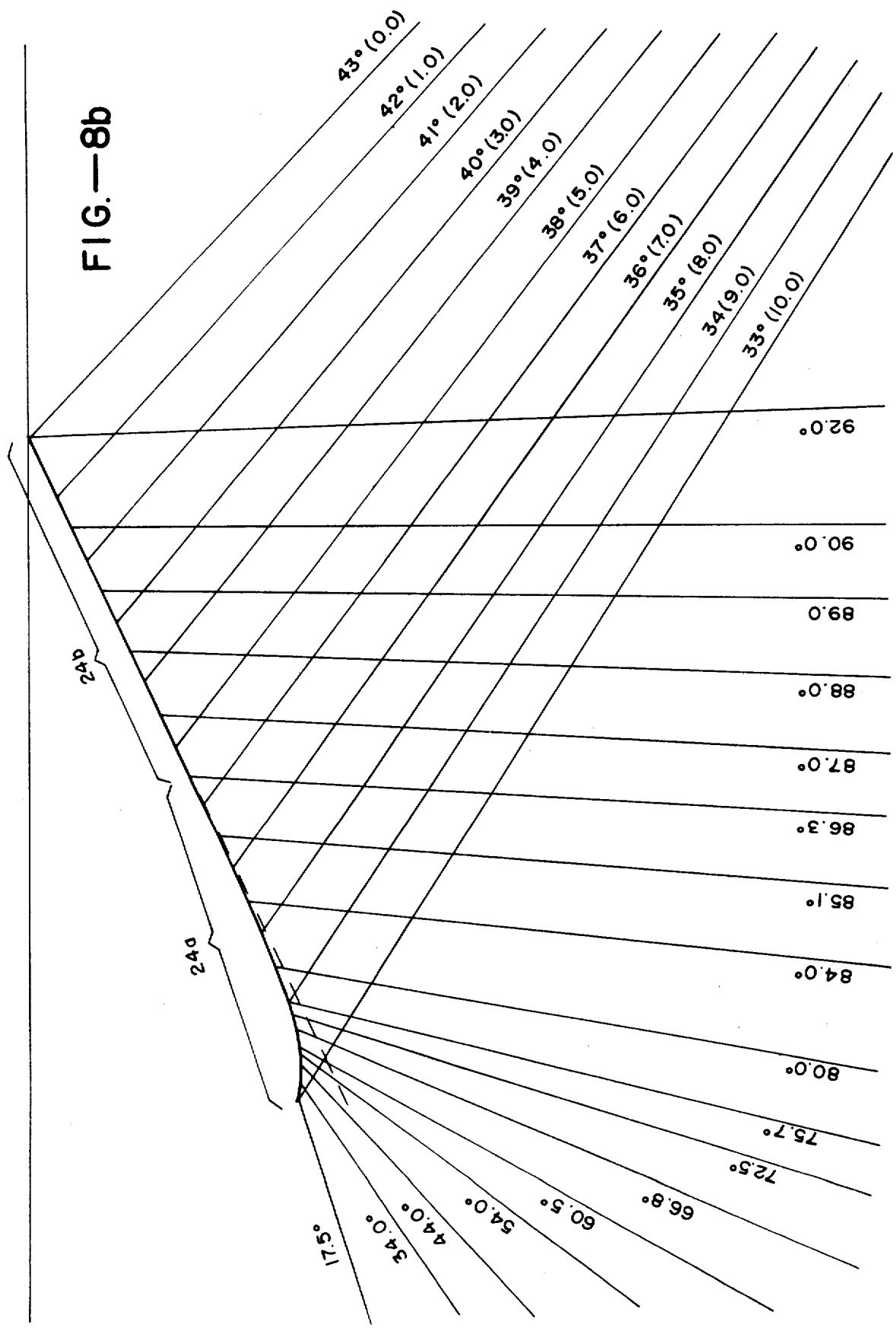

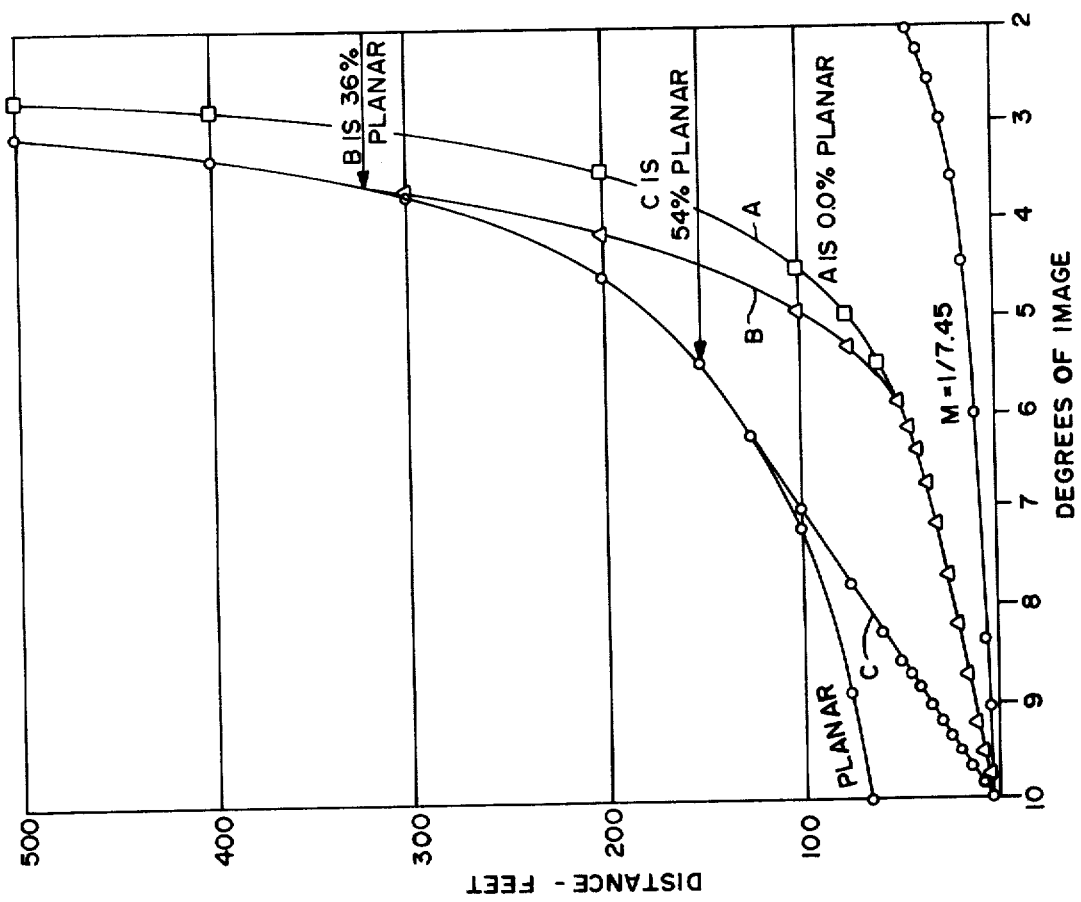
FIG.—9b
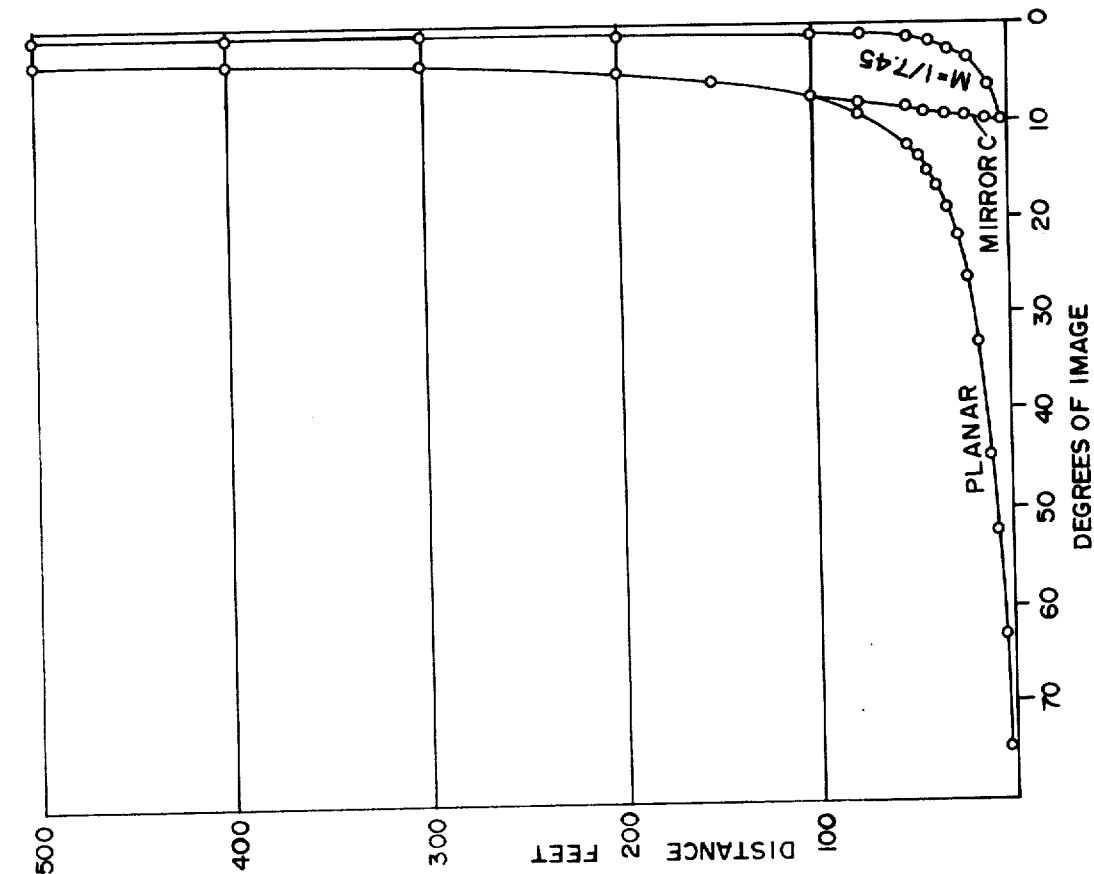
FIG.—9a

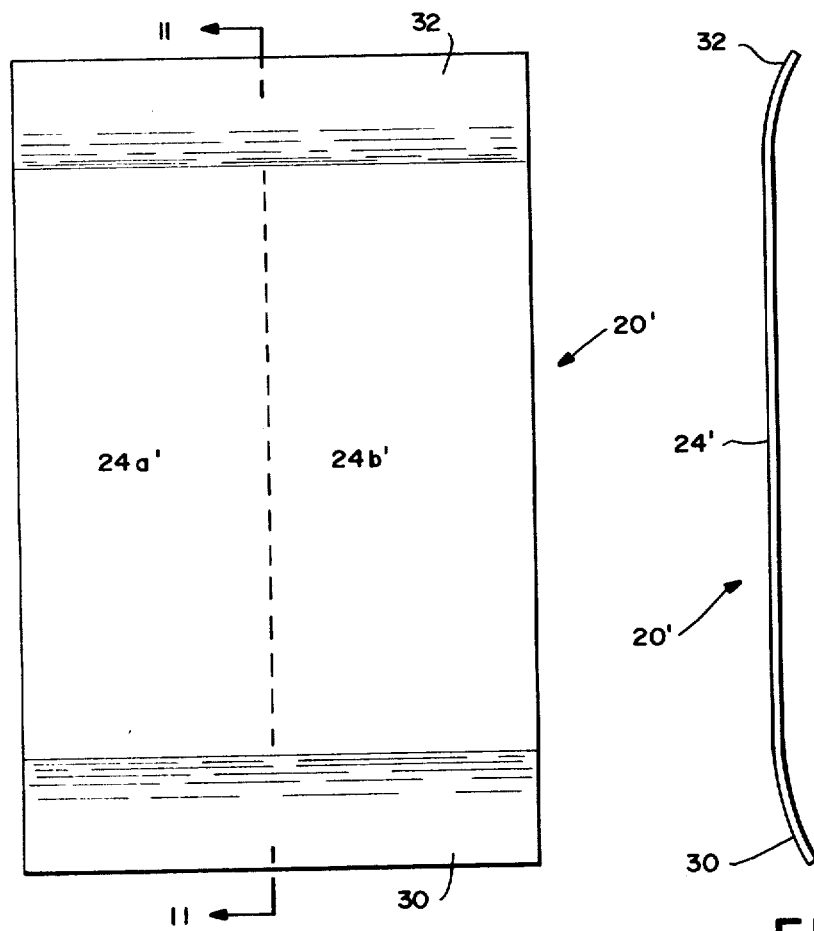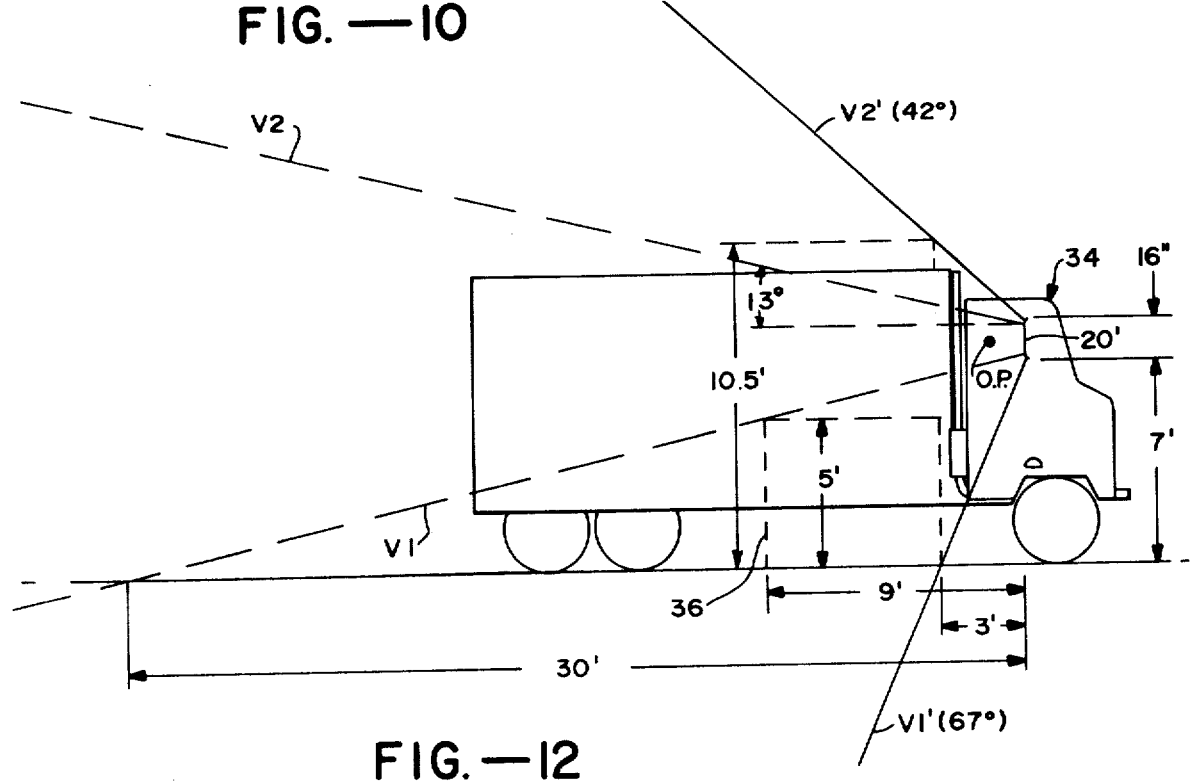
FIG.—10  FIG.—11  FIG.—12

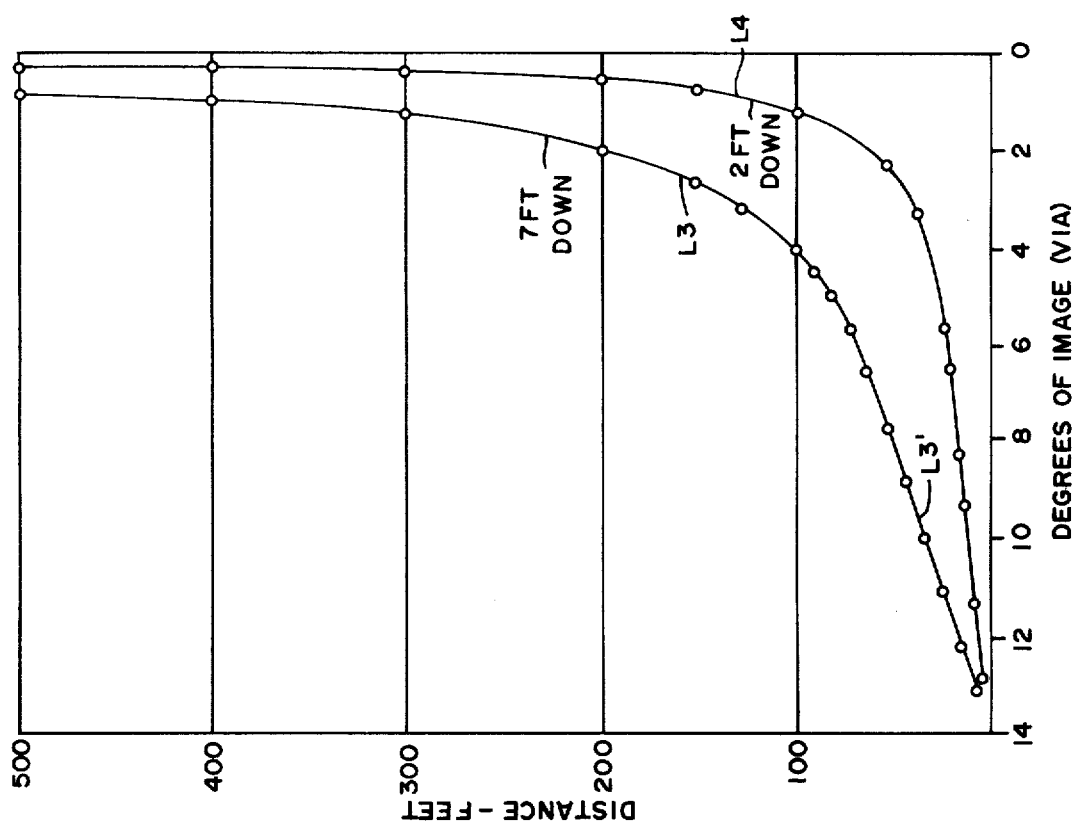
FIG.—14
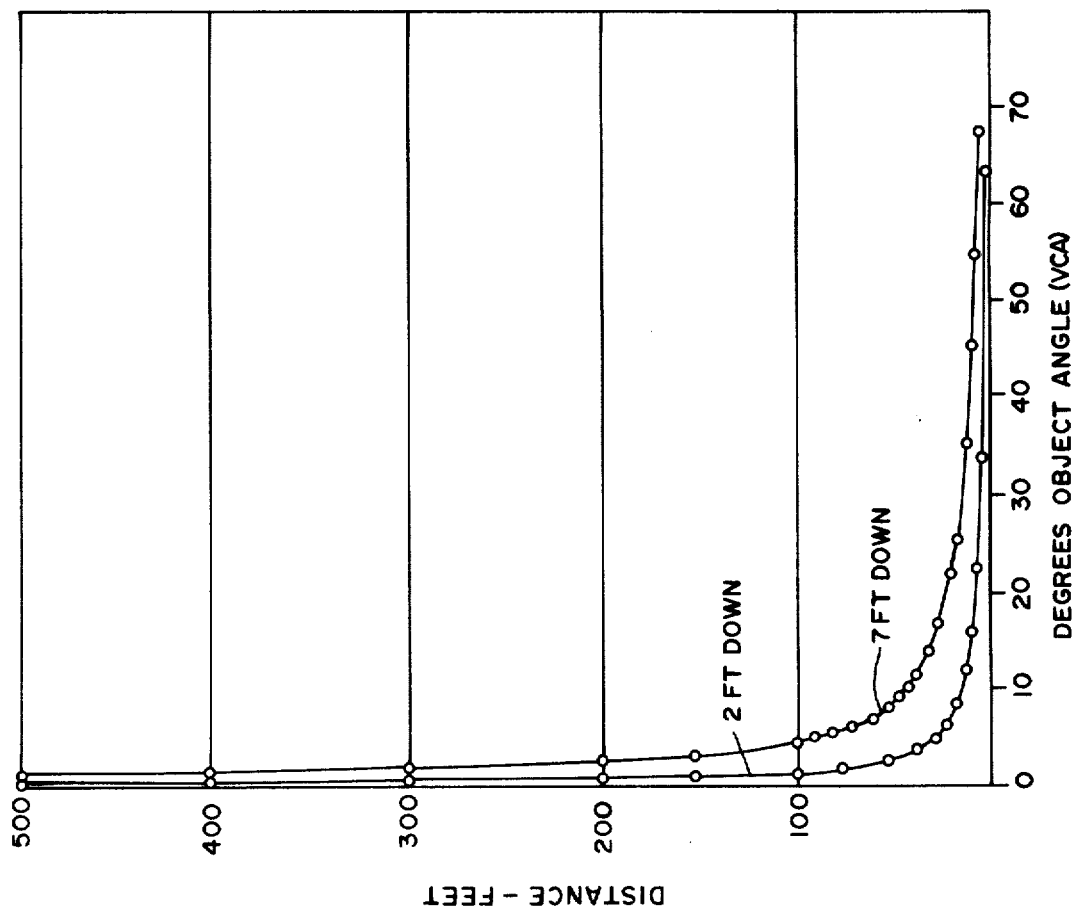
FIG.—13

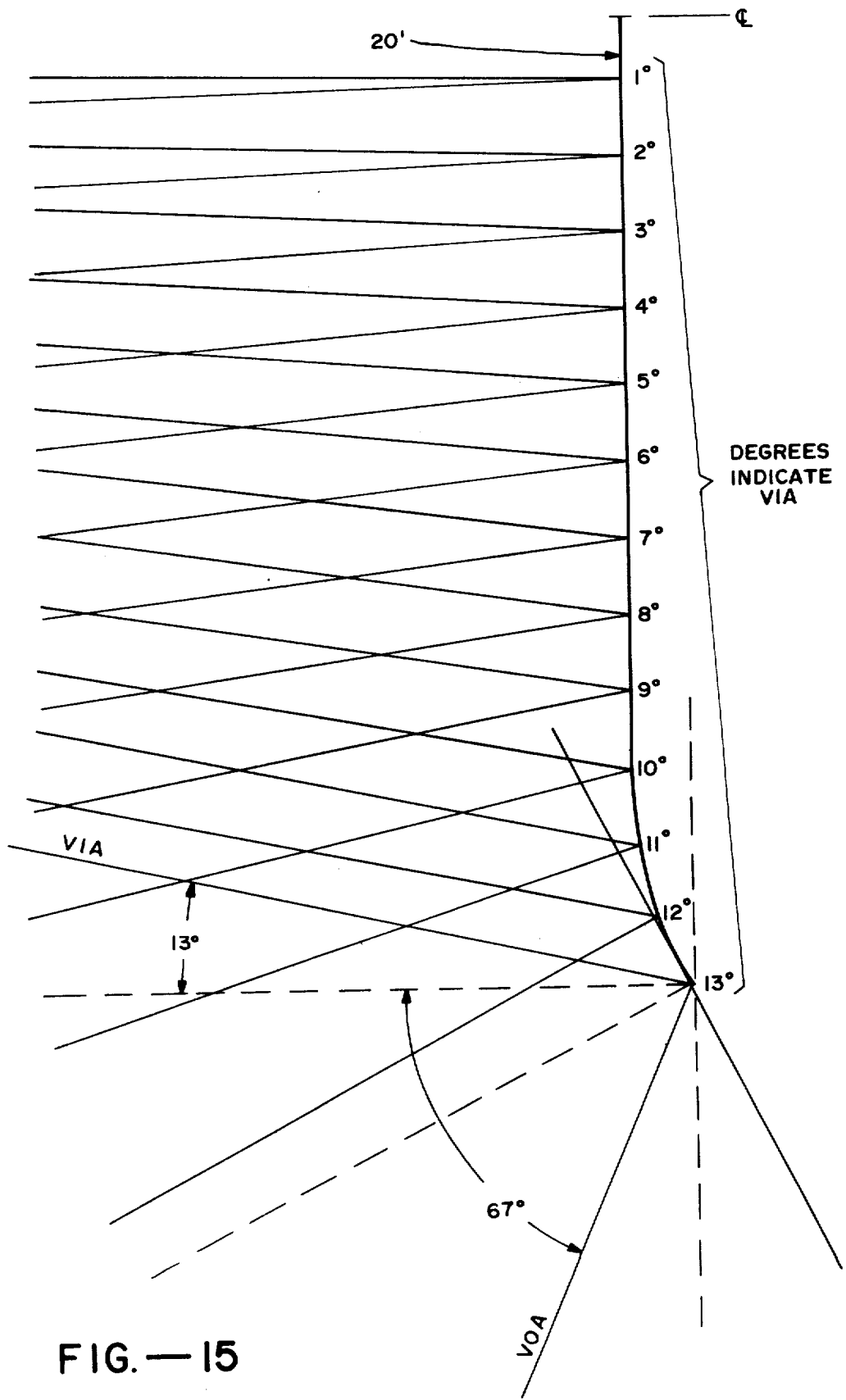
FIG.—15

REAR VIEW MIRROR ASSEMBLY

BACKGROUND OF THE INVENTION

The present invention relates generally to rear view mirrors for vehicles and more particularly to an improved rear view mirror assembly (1) which eliminates the blind spot that normally occurs just before the passing vehicle comes abreast of the lead vehicle (2) which more accurately reflects the position and movement of the passing vehicle as the latter approaches the lead vehicle, and (3) which in one embodiment provides a field of view that not only eliminates the blind spot but also incorporates the rear tires on the mirror supporting side of the lead vehicle.

In the past, it has been general practice by most drivers, especially drivers of tractor-trailers and recreational vehicles to use two rear view mirrors on one side of the vehicle, a main mirror and a secondary mirror. Typically, this main mirror is large and planar for providing a view back down the road a substantial distance behind the driver, especially since its usual field of view is limited to about 10°. On the other hand, the secondary mirror is typically smaller and consists of a convex section of a sphere, generally referred to as a "bulls eye" mirror. This latter mirror is utilized to eliminate the blind spot located to one side of the driver of the lead vehicle and its use is limited to that general field of view. As a result, the driver is required to move his eyes from one mirror to the other in order to keep track of the other vehicles on the road. Moreover, because the "bulls eye" mirror is spherical in nature and typically defines a relatively small radius of curvature the image reflected is badly distorted both in its vertical and horizontal planes.

The general effect of the "bulls eye" mirror is to give a distorted view of the size and speed of the oncoming vehicle. More specifically, as this latter vehicle approaches the blind spot of the main mirror, the image in the secondary "bulls eye" mirror is quite small (in all dimensions) relative to the actual size of the vehicle. However, as the oncoming vehicle moves forward and comes nearly abreast of the driver, the image appears to grow in size and "jump out" from the mirror at such a rapid rate as to exaggerate its forward speed. The problem is that the image is at first so small as to make the approaching vehicle appear to be at a considerable distance behind the driver's vehicle until the "jumping out" effect which occurs only when the approaching vehicle is already at an unsafe nearness. Because of this "jumping out" effect and movement of the eyes from one mirror to the other, safety to the drivers of the lead vehicle and passing vehicle as well as others in the near vicinity are threatened by the inability of the driver of the lead vehicle to quickly and accurately judge the situation as it relates to the passing vehicle. Because of these difficulties many drivers choose to ascertain the presence of a passing vehicle by turning their heads for a fraction of a second just before starting to pass another vehicle themselves. This, of course, causes a momentary distraction of the driver's view ahead where new hazards may suddenly occur.

There have been some suggestions in the prior art for eliminating some of the problems discussed above. For example, German Pat. No. 1,921,076, dated Nov. 19, 1970 discloses a rear view mirror including an overall mirrored surface having a planar section and an integral curved section which together presumably provide the same field of view as the planar mirror and separate convex mirror discussed above. While this patent appears to eliminate the problems associated with using two distinct mirrored assemblies for eliminating the blind spot and for viewing substantial distances rearwardly, it does not address itself to the problem of distortion (of speed and size) discussed previously. Specifically, this reference does not teach or suggest any means or method for eliminating the exaggerated way in which the on-coming or trailing vehicle is viewed as the latter approaches the lead vehicle.

Another prior art reference which combines two mirrored surfaces for increasing the field of vision is U.S. Pat. No. 4,012,125 (Hart), dated Mar. 15, 1977. However, like the German patent, this reference does not address itself to the problem of image distortion with respect to size and speed (jumping out effect) as the passing vehicle approaches the lead vehicle. In fact, this patent specifically teaches the utilization of mirrored surfaces each having a constant magnification (which includes demagnification) ratio M, at least in horizontal planes through the mirrored surfaces. One object of the patent was to eliminate angular distortion and this was achieved by maintaining a constant magnification ratio. However, Applicant has found that as the image of an approaching vehicle moves horizontally across the mirrored surface of the lead vehicle it does so at a speed which, by virtue of the constant magnification ratio of the mirrored surface, seems grossly distorted relative to the speed of the oncoming vehicle. In this regard, Applicant has found that a linear relationship between movement of the trailing vehicle and its image across the mirror eliminates such distortion. However, since each of the mirrored surfaces disclosed in the Hart patent is designed with a constant magnification ratio in the horizontal plane, Applicant has also found that there cannot be a linear relationship between the position of the passing vehicle and the horizontal position of its image on the mirrored surface, as viewed from a given observation point, specifically the eyes of the driver of the lead car. This does not mean however, that any mirrored surface having a magnification ratio which varies across its horizontal extent automatically defines the linear relationship just discussed. As will be seen hereinafter, the mirrored surface must be of a particular curvilinear configuration to provide this type of linear relationship as will be described hereinafter. Applicant has discovered that distortion of the type described can thus be reduced by providing a curved surface based on a changing magnification ratio (to be described hereinafter). The rear view mirror assembly constructed in accordance with the present invention includes such a mirrored surface, thereby reducing and preferably eliminating the distortion described above, as will also be seen.

In addition, the assembly of the present invention eliminates the aforedescribed blind spot and, in a particular embodiment, it provides a relatively wide field of view including the rear tires of the mirror-mounted side of the vehicle as well as a tailgating vehicle. This wide field of view is attained even for mirrors mounted relatively high on large trailer trucks and the like by providing a vertical curvature similar to the horizontal curvature described above, as will be seen.

OBJECTS AND SUMMARY OF THE INVENTION

One object of the present invention is to provide a rear view mirror assembly which is uncomplicated in design, economical to provide and yet one which overcomes the various drawbacks discussed previously.

A more specific object of the present invention is to provide a rearview mirror assembly which is adapted for connection to one side of a vehicle and which eliminates the blind spot typically located on that side while, in a particular embodiment, at the same time providing an undistorted field of view to the rear including the rear tires located on the mirror-mounted side of the vehicle, even if the assembly is mounted relatively far from the ground as on a large trailer truck or the like, and the top front edge of the trailer when one is being pulled.

Another specific object of the present invention is to provide a rear view mirror assembly which allows the driver to more reliably judge the position and speed of an oncoming vehicle as the latter approaches from behind.

As will be seen hereinafter, the rearview mirror assembly disclosed herein is one which is adapted for mounting to one side of a given vehicle in a fixed position relative to a predetermined observation point in the vehicle for viewing a second trailing vehicle when the lead vehicle is in one lane and the second vehicle is in the next adjacent lane in a position along a substantially straight line path behind the lead vehicle. As will also be seen, this assembly includes a mirrored surface and a mounting structure adapted for connection to the side of the lead vehicle in the fixed position recited so as to view the oncoming vehicle.

In accordance with one aspect of the present invention, the mirrored surface of one assembly disclosed herein when in the position described provides a rearward field of view including the previously described blind spot at the front edge of the field and also a view of a tailgating vehicle. This is accomplished by designing the mirrored surface to provide a rearward view which, in a horizontal plane through this surface, extends from a forwardmost point about 15° to 20° rearward of a line extending normal to the path of movement of the vehicle and through the mirrored surface to a rearward point about 91° to 93° and preferably about 92° from the same normal line.

In accordance with another aspect of the present invention, the mirrored surface of the one assembly disclosed herein includes a segment which is curved in any horizontal plane therethrough in accordance with decreasing magnification ratios M (to be described) for reducing the previously described image "jumping out effect". In a preferred embodiment this surface segment defines a substantially linear (that is straight-line) relationship between (1) the position of the second vehicle (actually a given point on the second vehicle) when the vehicle (actually the given point) is located along the aforedescribed straight-line path, within a predetermined range of distances from the mirrored surface segment, and (2) the horizontal position of its image on the mirrored surface segment as viewed from the observation point. In this way, the image moves horizontally across the surface segment at a speed substantially linearly proportionate to the speed of the oncoming vehicle relative to the speed of the first vehicle. This in turn allows the driver of the first vehicle to more accurately judge the position and speed of the oncoming vehicle, specifically when the latter is within a predetermined distance range behind the driver. The mirrored surface just recited preferably includes a second segment which is preferably planar and thus has a magnification ratio, M, of 1 and provides an undistorted image of an approaching vehicle that is behind the lead vehicle. The magnification ratio of the first segment varies over a range of values and approaches as a limit at the edge nearest the second segment a value of 1. Thus the image of the trailing vehicle is seen continuously and with magnification decreasing smoothly from a value of 1 to a lesser value (preferably greater than 1/100) until it reaches the unaided peripheral vision of the driver of the lead vehicle.

In accordance with still another aspect of the present invention, the mirrored surface of another assembly disclosed herein not only includes the horizontally curved segment and a planar segment just recited but also a vertically curved segment along a bottom edge portion of the mirrored surface. This latter segment is preferably curved to define the same type of linear relationship, that is, a linear relationship between (1) the position of a given point on a second trailing vehicle when the latter is located along the aforedescribed straight line path, within a predetermined range of distances from the vertically curved segment and (2) the vertical position of its image on this latter segment as viewed from the observation point. This particular feature is especially suitable for mirror assemblies to be mounted relatively far from the ground which is typically the case when used with trailer trucks or the like. In this way, the driver cannot only see his rear tires on the mirror mounted side but he can also see a relatively small vehicle such as a Volkswagen, even when the latter is to one side of the driver. This is to be distinguished from the situation which exists when a vertically planar mirror is utilized with a large vehicle such as a trailer truck or the like. In this latter case, it has been found that a typical vertically planar mirror, for example one having a vertical span of 16 inches and mounted, for example, 7 feet from the ground will not provide a view of a compact vehicle, for example, a Volkswagen, which is 5 feet high and which has its front edge 3 feet back from the mirror, as will be seen hereinafter.

In accordance with yet another aspect of the present invention, the mirrored surface just described is also vertically curved along a top edge portion and is particularly suitable for use with the large vehicle just recited. The particular curvature provided along the top edge portion is one which would include the top front edge of a trailer being pulled and in a preferred embodiment also provides the linear relationship described previously. This is quite helpful for vehicles pulling trailers under a bridge or other such obstructions.

BRIEF DESCRIPTION OF THE DRAWINGS

FIG. 1 is a schematic illustration, in plan view, of two vehicles moving in the same direction on a roadway, the first lead vehicle including a rear view mirror assembly constructed in accordance with the present invention and a second trailing vehicle attempting to pass the lead vehicle.

FIG. 2 is a schematic illustration, in plan view, showing the trailing vehicle in a number of positions behind the lead vehicle and showing the rear view mirror assembly of the lead vehicle exaggerated in size to illustrate how the image of the trailing vehicle moves across the mirrored surface of the assembly.

FIG. 3 schematically illustrates the mirrored surface of the assembly in horizontal cross-section, particularly showing how the image of the approaching vehicle is reflected off of the mirror towards a fixed observation point, specifically the viewing point of the driver in the lead vehicle.

FIG. 4 is a horizontal sectional view of the mirrored surface similar to the view in FIG. 3 but showing specific geometric considerations which are necessary to design the specific curvature of the mirrored surface in accordance with the present invention.

FIG. 5 is a graphic illustration representing the angles of view (object angles) presented by an approaching vehicle as a function of distance.

FIG. 6 is a diagrammatic illustration of the mirrored surface illustrated in FIGS. 3 and 4, particularly showing the overall field of view provided by the mirrored surface as it relates to a passing vehicle which is located in what would otherwise be the blind spot and as it relates to the lead vehicle itself and especially the fact that the field of view includes points directly behind the lead vehicle.

FIGS. 7a, b and c are graphic illustrations of the way in which the image of the passing vehicle moves horizontally across the mirrored surface in two specific embodiments, as this latter vehicle approaches the lead vehicle.

FIG. 8a is a horizontal sectional view of a mirrored surface designed in accordance with an actual preferred embodiment of the present invention and illustrating actual object and image angles.

FIG. 8b is a horizontal sectional view similar to FIG. 8a but of another embodiment.

FIGS. 9a and 9b are graphic illustrations specifically illustrating the way in which the image of the approaching vehicle moves across the mirrored surface designed in accordance with a number of embodiments including the preferred embodiment (FIGS. 7a and 8a) as compared to the way in which the image moves across a curved mirrored surface designed in accordance with the prior art and one which is fully planar (if this were large enough).

FIG. 10 is a frontal view of a rear-view mirror assembly constructed in accordance with another embodiment of the present invention.

FIG. 11 is a vertical sectional view of the assembly of FIG. 10, taken generally along line 11—11 in FIG. 10.

FIG. 12 is a schematic illustration in side elevational view, of a relatively large vehicle, specifically a trailer truck or the like utilizing the rear-view mirror assembly of FIGS. 10 and 11 and particularly illustrating the vertical field of view obtained by this assembly as compared to a planar mirror of the prior art.

FIG. 13 is a vertical graphic illustration similar to the horizontal illustration of FIG. 5, but specifically for the rear view mirror assembly utilized with the vehicle illustrated in FIG. 12.

FIG. 14 is a vertical graphic illustration similar to the horizontal illustrations of FIGS. 7a and b, but specifically for the assembly utilized with the vehicle of FIG. 12.

FIG. 15 is a vertical sectional view of a mirrored surface designed in accordance with an actual embodiment of the present invention, specifically the one especially suitable for use with the vehicle illustrated in FIG. 12.

DETAILED DESCRIPTION AND PREFERRED EMBODIMENTS

Turning now to the drawings, wherein like components are designated by like reference numerals throughout the various figures, attention is first directed to FIG. 1. This figure diagrammatically illustrates two vehicles 10 and 12 moving in the same direction on a roadway, as indicated by arrows 14 but in different lanes generally indicated at 16 and 18. As seen in FIG. 1, lead vehicle 10 includes a rear view mirror assembly 20 which is constructed in accordance with the present invention. This assembly is mounted on the driver's side of the vehicle by means of a conventional mounting structure 22 and includes a mirrored surface 24 which is maintained in a fixed position relative to a predetermined observation point OP within the vehicle, specifically the viewing point of the driver for viewing vehicle 12. In this regard, the mirrored surface is preferably adjustable (by conventional means, not shown) to suit the observation points of different drivers. In addition, the horizontal field of view provided by mirrored surface 24 is specifically illustrated in FIG. 1 as extending between vertical planes P1 and P2 and end at opposite sides of the mirrored surface. As specifically seen in FIG. 1, plane P1 is located at an angle $\Theta_l$ rearwardly of a vertical plane P3 extending through mirrored surface 24 normal to the vehicle's direction of movement. Plane P2 is located at an angle $\Theta_n$ behind plane P3.

As stated previously, mirrored surface 24 is designed in accordance with the present invention to provide two special features. First, the overall field of view of this mirrored surface is sufficiently wide horizontally to not only include what is normally the driver's blind spot but also the rear of the mirror-mounted side of vehicle 10 and directly behind the latter. This is accomplished by specifically designing mirrored surface 24 so that plane P1 (which limits the forwardmost field of view) is between about 15° and 20° rearward of plane P3 and preferably about 17.5°. This clearly includes the previously described blind spot. Plane P2 on the other hand is located between approximately 91° and 93° rearward of plane P3, preferably 92° since this is normally all that is required to extend beyond a vertical plane coinciding with the side of vehicle 10 including assembly 20. Hence, as illustrated in FIG. 1, the field of view includes the rear of the mirror-mounted side of vehicle 10 and a portion of tailgating vehicle (not shown). Moreover, the mirrored surface may be of sufficient length vertically or vertically curved as in another embodiment (as will be seen) to incorporate the rear tires on that side within the field of view as seen from point OP.

The second special feature of mirrored surface 24 discussed previously can be initially illustrated best in FIG. 2. As seen in this figure, vehicle 12 is illustrated in a number of different positions as it approaches the lead vehicle 10. In this regard, as stated previously, the overall rear view mirror assembly is shown exaggerated in size. In addition, the arrows 26 extending horizontally across mirrored surface 24 represent the movement of the image of vehicle 12 as viewed at point OP as the on-coming vehicle moves from position 1 to position 2 and so on until it passes beyond plane P1 (not shown in FIG. 2). As will be seen hereinafter, this second special feature of mirrored surface 24 resides in the use of a segment which is specifically designed to minimize the previously described "jumping out effect" by defining a substantially linear relationship between the position of vehicle 12 as it moves from position 1 to position 2 and so on and the horizontal position of its image as it moves in the direction of arrows 26. In this way, the image moves horizontally across the surface segment, as indicated by arrows 26, at a speed substantially linearly proportionate to the speed of vehicle 12 as the latter moves through the various positions shown. As will be seen in a preferred embodiment, this special linear relationship between the oncoming vehicle and its image occurs only when the oncoming vehicle is within a predetermined range of distances from the lead vehicle. The second horizontal segment of the mirrored surface provides rearward viewing beyond this range and specifically includes the rearward section of vehicle 10, as described above.

In order to more fully understand the nature of mirrored surface 24 from a structural standpoint certain positional relationships must be assumed and certain definitions must be provided. With regard to the former, it is to be assumed, at least for the purpose of describing a specific embodiment of the mirrored surface, that vehicle 12 (the trailing vehicle) is relatively small, specifically six feet wide and 12 feet long, which is about the size of a Volkswagen or similar compact automobile. The right side of vehicle 12 (the side closest to vehicle 10) is 3 feet to the left of mirror assembly 20 measuring from the outermost point of the mirrored surface. Moreover, the mirrored surface itself in this embodiment is assumed to have a horizontal extent of 7 inches and in some embodiments a vertical extent of 10 inches or more, and it is positioned approximately 30 inches from the driver's eye (the observation point OP). In this way, the maximum angular extent across the mirrored surface from one vertical edge to the other as measured from point OP is approximately 10°, as best seen in FIG. 6. In this regard, for purposes of limited drawing space, the rays (lines) to point OP have been broken away in this figure and in FIG. 3. Obviously, the size of vehicle 10 is not relevant with respect to viewing oncoming vehicle 12 except that it is to be assumed that vehicle 10 contains no obstruction to the rearward field of view other than its rear side illustrated and discussed with respect to FIG. 1. In addition, it should be noted that the rear view mirror assembly of the present invention is especially suitable for use with large vehicles such as tractor-trailer and recreational vehicles. Moreover, whether the rear view mirror assembly is located to the driver's left as illustrated in FIGS. 1 and 2 or to his right just outside the passenger side of the vehicle, the various positional relationships just described would be the same, except of course that the vehicle being viewed would be located to the right of the lead vehicle and the position of the observation point (the driver's view) would change and hence change the total image angle, and therefore, require adjustment of curvature of the mirror to achieve the same object angle relationship.

With regard to specific definitions which are necessary to more fully understand the present invention, attention is directed to FIGS. 3 and 4. FIG. 3 diagrammatically illustrates mirrored surface 24 in horizontal cross-section as it is located relative to plane P3 and observation point OP. This latter figure specifically illustrates a number of object angles $\Theta_1$, $\Theta_2$, and so on through $\Theta_n$ and a number of image angles $\alpha_1$, $\alpha_2$, and so on through $\alpha_n$. Any of the object angles may be defined as that angle subtended by plane P3 and a line extending from the object point being viewed to the particular point on mirrored surface 24 at which the image appears from observation point OP (in the counter-clockwise direction). On the other hand, the image angle can be defined as that angle subtended by a straight line between the image on the mirrored surface and the observation point OP and plane P3 (in the clockwise direction). As illustrated in FIG. 3, each object angle $\Theta_1$, $\Theta_2$, and so on includes its own associated image angle, $\alpha_1$, $\alpha_2$, and so on. It should be apparent that each object angle and associated image angle represent a particular position of a given point on vehicle 12 relative to the mirrored surface and observation point OP in vehicle 10. The horizontal "magnification ratio" (M) at any given section along the mirrored surface is $\Delta IA/\Delta OA$ along that section, i.e., the change in image angle over change in object angle.

Referring to FIG. 4, there are other positional relationships which must be defined. As seen in this latter figure, the particular object angle line and its associated image angle line are shown impinging on a curved segment of mirrored surface 24 at a particular point. A tangent T to the curved surface can be drawn at that point along with a line n normal to the tangent line. In this way, it can be seen that the object angle line and the tangent define an incident angle "i" and the image angle line and the tangent define an equal reflection angle "r".

Based on the foregoing positional relationships and definitions, it will become apparent that a mirrored surface can be designed which meets certain criteria. It will also be seen that the mirrored surface of the present invention is specifically designed to include the various features discussed previously. However, it should be equally apparent from the discussion to follow that a mirrored surface which includes these various features can be readily provided even if the positional relationships described should be different, of course, assuming these relationships are known ahead of time. Moreover, this is true whether the surface being designed is to have a specific horizontal curvature, a specific vertical curvature or both.

As stated above, based on the positional relationship between vehicles 10 and 12 and mirrored surface 24, each of the object angles $\Theta_1$, and $\Theta_2$ and so on represent the actual position of trailing vehicle 12 in lane 18 relative to vehicle 10. Object angle $\Theta_1$ represents the closest position at which the entire vehicle 12 can be viewed by mirrored surface 24 from observation point OP. Note that the outermost part of the front of the vehicle position seen in FIG. 6 is observed at the extreme outer edge of the mirrored surface. Angle $\Theta_n$ on the other hand represents the rearwardmost limit of view provided by mirrored surface 24 from observation point OP which, as noted, is at the nearest edge of the mirrored surface. The various object angles between these extremes obviously represent the positions of the vehicle 12 therebetween. This is best seen in FIG. 5 which shows objects angles as a function of distance for three different points on vehicle 12 as indicated on the figure. As stated above, each object angle has an associated image angle. Hence, image angle $\alpha_1$ which is seen at an extreme far edge of the mirrored surface represents the closest position of vehicle 12 while $\alpha_n$ which is seen at the closest edge of the mirrored surface represents the rearwardmost point of view. As seen in FIG. 6, the entire horizontal extent of mirrored surface 24 in the embodiment illustrated includes a 10° image angle span.

Referring to FIGS. 7a and b, the general way in which the image angle $\alpha$ varies with the position of vehicle 12 relative to mirrored surface 24 (based on the positional relationship described above) is graphically illustrated for two embodiments, specifically for a mirror assembly "B" (FIG. 7a) and an assembly "C" (FIG. 7b). While the horizontal extent of mirrored surface 24 spans 10° from an image angle standpoint, as just stated, the horizontal axis represented in FIGS. 7a and b includes only 8° of the mirrored surface. More specifically, while the maximum extent of the viewing image on mirrored surface 24 may be separated into 10° as seen in FIG. 6, only 8° are required for the graphic illustrations of FIGS. 7a and b. The vertical axis represents distance between mirrored surface 24 and the front end of vehicle 12. Lines L1 and L2 represent the way in which the image of the front left and the rear right, respectively, of vehicle 12 (the driver's side and passenger side, respectively) move across the mirrored surface from right to left as the vehicle moves closer to vehicle 10. Referring to FIGS. 8a and b, in conjunction with FIGS. 7a and b, in accordance with the present invention, mirrored surface 24 while preferably being an integral surface can be functionally separated into at least two segments 24a and 24b. In this embodiment, both of these segments are preferably planar in any vertical plane therethrough, thereby eliminating vertical distortion of the image shape (as opposed to distortion in speed and movement). Moreover, segment 24b is preferably planar or substantially planar in any horizontal plane therethrough, particularly as this segment extends further from section 24a. Thus, section 24b which comprises the near horizontal side of the mirrored surface provides substantially or entirely undistorted rearward viewing of shapes at far distances, specifically at positions between object angles $\Theta_4$ and $\Theta_n$ in FIG. 3. In a preferred embodiment, surface section 24b comprises approximately 36% of the overall mirror. This section is particularly designed so that the maximum rearward viewing angle $\Theta_n$ is greater than 90°, specifically between 91° and 93° and preferably 92° as illustrated in FIG. 6. In this way, the backside of vehicle 10 can be viewed. Before proceeding with the detailed description of the invention it will be helpful to examine the geometric relationship of an approaching vehicle to the driver's observation of this in a rear view mirror. This was done graphically up to distances of about 100 feet and mathematically thereafter up to 500 feet rearwards of the driver's mirror. The approaching vehicle was a small vehicle 6 feet wide and 12 feet long with its forward left corner being used as one reference angle, called object angle (OA) and this point is 9 feet to left of driver's mirror. Another reference angle is for front left corner 12 feet to left of driver's mirror. A third is the rear right corner 3 feet to left and 12 feet back. FIG. 5 shows how the object angle (OA) follows curves rapidly changing in slope up to a distance back of between 50 and 150 feet. This rapid change in slope is the cause of the "jumping out" effect previously mentioned. Note from FIGS. 9a and 9b how a planar mirror would have to be approximately 50 inches wide to include the "jumping out" part of the image and the practical impossibility of this is what causes the blind spot or zone near the driver's vehicle. Also note in FIGS. 9a and 9b how the prior art method of fixed magnification ratio, designed in this case to provide the same angular range of object angle, while solving the blind zone problem, would have the "jumping out" problem.

In a preferred embodiment of this invention designated as Mirror B in FIG. 9b, a smooth transition is obtained from planar to curved mirror surface starting at about 300 feet back.

Thus it may be seen that the method taught is to provide controlled curvature and magnification ratio (M value) so as to offset the geometric "jumping out" effect caused by the rapid increase in object angle (OA) as the passing vehicle approaches the driver's mirror. One could say that a special curvature is created so as to balance or offset the increase in OA. In the prior art methods, on the other hand, the constant M naturally leads to the "jumping out" effect which results from rapid change in OA as the pursuing vehicle approaches. In the prior art method using a constant M value means that the curve for image angle (IA) merely parallels the planar curve, at a scale reduced so as to eliminate the need for a mirror 50 inches wide.

FIG. 9b offers two additional embodiments, specifically Mirror A and C. Mirror A has no planar part while Mirror C is 54% planar. Both Mirrors A and B have the linear relationship up to about 35 feet rearwards. Mirror C has the linear relationship up to about 150 feet rearwards.

Where section 24b is planar, its M at any point along its length (horizontally) is constant, specifically equal to one. This of course is the reason this section provides undistorted viewing of shapes. However, as stated previously, a constant M, even one equal to unity as in a planar mirror, results in excessive image distortion or exaggeration with respect to speed and movement generally of the object being viewed, especially at close range. Therefore, section 24a which is provided for close range viewing has a continuously decreasing M, as will be seen, to reduce and preferably eliminate this type of distortion. Mirrored surface 24a which, as stated, is responsible for viewing vehicle 12 at close range, specifically as it approaches vehicle 10 (between about object angle $\Theta_1$ and $\Theta_4$), is curved in the horizontal plane. However, as also stated, this latter mirrored section is not curved in just any way but rather in accordance with decreasing Ms (from right to left in FIGS. 7a and b) so as to define the linear relationship between the position of the second vehicle when the latter is within a predetermined range of the first vehicle and the horizontal position of the image on surface segment 24a, as described previously. This is best illustrated in FIGS. 7a and b by means of the straight line section L1' of line L1. Note that as the object point on vehicle 12 represented by line L1' moves toward vehicle 10 (down the vertical axis) its image moves linearly across surface segment 24a (along the horizontal axis). Also note that this is the only segment of either line (in both figures) which does this. In other words, until the object point being viewed moves into the view of the right position of surface segment 24a, represented by L1' in FIGS. 7a and b, its position/image relationship is not a linear or straight-line relationship. It should be apparent that because of this linear relationship as the object actually moves, its velocity and the velocity of its image are linearly proportionate. Hence, the driver of vehicle 10 can readily judge the speed and position of the passing vehicle as the latter comes within the view offered by the right portion of segment 24a.

It should be apparent from FIGS. 7a and b that the straight-line relationship illustrated has a fixed slope which is dependent upon the amount of mirrored surface 24 that is linear for a given length of actual movement of trailing vehicle 12, for example the last 30 feet. Where the slope is at 15°, for example, the image in section 24a moves horizontally at a particular speed that is proportional to the speed of the approaching vehicle. On the other hand, where the slope is greater than 15° for the same distance (e.g. 150 feet), the image moves slower while for slopes less than 15°, the image moves faster. However, in each of these cases image movement is always linearly proportionate to movement of the approaching vehicle. Hence, if the latter moves at a constant speed, image speed will be constant. If the approaching vehicle accelerates or decelerates, the image movement will accelerate or decelerate proportionately. This allows the driver to use section 24a not only for observing the approaching vehicle but also as a tool for gauging its speed and position as it approaches.

It should also be apparent from FIGS. 7a and b in conjunction with FIGS. 3 and 8a and b that the entire mirrored surface 24 is comprised of curved section 24a and planar or nearly planar section 24b. In this regard, it is to be understood, as stated previously, that the present invention is not limited to this straight-line relationship (although it is preferred) but rather one which is closer to this type of relationship than is obtained when the M of the curve is constant. In any event, this results in decreased M's at successive points along the horizontal extent of the curved surface.

As stated above, mirrored surface 24 is designed with specific parameters in mind, as dictated by the aforedescribed positional relationships including the particular size of the mirrored surface recited. First, angle $\Theta_1$ is approximately 17.5°, as stated. This would just include the left front point of vehicle 12 when the latter is 3 feet behind plane P3 (9 feet from the mirrored surface), clearly eliminating the aforedescribed blind spot. Angle $\Theta_n$ is approximately 92°, thereby allowing the mirror mounted side of vehicle 10 to be readily viewed. In this regard, if the mirror is sufficiently long vertically, it can provide a view of the rear tires on this same side which is of particular advantage to the driver of a tractor-trailer, recreational vehicle or other such large vehicle. However, in the specific embodiment described above, the length of mirrored surface 24 is approximately 10", which is not sufficient to provide this particular view, unless the tires are about 30' back or unless the mirrored surface is also vertically curved, as will be discussed hereinafter. Object angle $\Theta_4$ separates the mirrored surface into the segments 24a and 24b.

In view of the foregoing, it should be readily apparent that mirrored surface 24 can be designed to provide the various parameters recited by means of reverse engineering, that is, by starting with the desired object angles and associated image angles based on mirror dimensions, positional relationships and the definitions discussed previously. The graphic illustration of FIGS. 7a and b as well as one for object angles (relative to distance) as illustrated in FIG. 5 is helpful to this end. In this regard, attention is specifically directed to FIGS. 8a and b which illustrate two actual mirrored surfaces 24 one of which is constructed in accordance with the preferred embodiment including the various features discussed above. Also, for purposes of comparison, FIGS. 9a and 9b illustrate the image angle versus distance for a mirrored surface which is constructed in accordance with a constant M (such as the prior art) but which has the same dimensions and positional relationship as surface 24, as described previously. This prior art type of surface has been specifically designed to have a magnification ratio of about 1/7.45 throughout its horizontal extent whereas this ratio is continuously changing along segment 24a of surface 24.

With respect to FIGS. 7a and b, it is worthy to note first that the lines L1 and L2 represent the horizontal bounds of the image in the mirrored surface constructed in accordance with the present invention. Moreover, it can be seen that line L1 includes a substantially straight section L1' which represents the linear relationship across at least a part of surface segment 24a. Note that in FIG. 7a this section extends from about 7° across the mirrored surface to the 10° mark which represents the outermost horizontal edge of the mirrored surface. From a distance standpoint, it also extends between about 3 feet and 30 feet back from previously described plane P3. Hence when a vehicle 12 moves through this range, its image is seen moving linearly across mirrored section 24a. A similar linear relationship is clearly absent in the prior art mirror as seen in FIGS. 9a and 9b. In fact, it can be seen that, as the trailing vehicle moves within the range of 3 to 50 feet from the leading vehicle, its image horizontally is clearly nonlinear. This image increases substantially with distance as it moves closer to the lead vehicle, enlarging in size at a rather high nonlinear rate. As a result, the driver of the lead vehicle may easily misjudge the position and speed of the passing vehicle.

As stated at the outset, one of the chief purposes of the present invention is to improve the drivers' ability to judge the position and speed of an approaching vehicle in the adjacent lane, especially when this vehicle is close to the driver's vehicle. It has been amply shown herein that this may be achieved by a mirror design which provides a linear relationship between the position of the approaching vehicle and the position of its image on the drivers' mirror. However, it has been found that another feature of the subject mirror that can easily be overlooked concerns the size of the image laterally, that is, from right to left, as this image moves across the mirror. Ideally, the size should increase in a continuous and predictable manner, preferably the image being at a maximum size just before the approaching vehicle reaches the unaided peripheral vision of the driver.

Referring again to FIG. 7a and FIG. 7b, as stated previously, L1 and L2 show the extreme edges of the image as the vehicle moves from 500 feet back to the closest position of 3 feet back. In these figures it may be observed, therefore, how the lateral size of the image varies as it moves across the mirror by simply noting the lengths of the horizontal lines terminating at L1 and L2 on these curves. In this regard note the considerable difference between FIG. 7a and FIG. 7b, the former which is for Mirror B appearing to come much closer to the above stated ideal condition, that is the size of the image increasing continuously as the distance decreases and reaching a maximum size at the closest position. Referring now to FIG. 7c, this is simply a presentation of data from FIG. 7a and 7b but it provides a more easily visible comparison of the image size relationship to distance. More specifically, FIG. 7c illustrates image width (horizontal axis) as taken from FIGS. 7a and 7b as a function of distance (vertical axis). Not only does Mirror B meet the above stated ideal condition but it has one further important advantage. In about the closest 50 feet, the size of the image increases at a faster but still linear rate across the mirror. This greater and linear rate of size increase corresponds in the close range of distance to the L1' part of the curve in FIG. 7a.

Mirror C on the other hand, as seen in FIG. 7b, has a steeper slope in L1 than that of FIG. 7a. In this same closest range of distance in which the size of image for B in FIG. 7c is rapidly and nearly linearly increasing, the size of image for C in FIG. 7c is rapidly and nearly linearly decreasing, reaching a size at 3 feet back about the same as that size for the same mirror found in FIG. 7c at 300 feet back.

The reason for the marked differences in image size—distance relationship between Mirror B and Mirror C lies in the difference in M values for the two mirrors and one indication of this is the considerable difference in slope of L1' between FIGS. 7a and 7b. Since M is equal to $\Delta IA/\Delta OA$, naturally a more gradual slope in L1' means a more gradual change in curvature of the mirror which in turn means a higher minimum M value at the mirror's outer-left-edge. Note in Tables I and II which follow that minimum M value for Mirror B is 1/60 whereas for Mirror C minimum M value is 1/183. Thus it is apparent that minimum M value should probably be greater than 1/100 and preferably greater than 1/70 or about 1/60.

Two other differences between Mirror B and Mirror C are (1) the length of L1' and (2) the percent of Mirror width that is planar. It appears that L1' should represent about 30 or 35 feet distance back and certainly less than 100 feet. Similarly, the percent of mirror that is planar should be about 30 to 40. This is because it is desirable for the mirror to offer a smooth and continuous transition from planar to maximum curvature as the image moves across the mirror.

The actual numerical values set forth in FIGS. 8a and b should be self-explanatory. For purposes of simplicity, the image angles of 43° to 33° have been converted to the 0° to 10° illustrated. The various calculations associated with FIGS. 7a and b, 8a and b, 9a and 9b for Mirrors B, C and A are set forth in Tables I, II and III below. Table IV offers complete data on object angles generally as used herein, which angles have either been discussed or will be. Table V presents complete data on object and image angles for mirrors B and C.

TABLE I

| | | MIRROR B 36% PLANAR | | |
|---|---|---|---|---|
| Feet to Rear (9' out) | Degrees Object Angle (OA) | Degrees* Image Angle (IA) | Mag. Ratio $\frac{\Delta IA}{\Delta OA}$ M | Degrees* Angle of Incidence Reflection | Degrees*** Tangent Angle |
| 3 | 17.5 | 10.0 | | 25.25 | −7.75 |
| | | | 1/60 | | |
| 5 | 29.5 | 9.8 | | 31.35 | −3.7 |
| | | | 1/44 | | |
| 6.8 | 37.0 | 9.6 | | 35.2 | +1.8 |
| | | | 1/30 | | |
| 8.7 | 43.0 | 9.4 | | 38.3 | +4.7 |
| | | | 1/25 | | |
| 10.6 | 48.0 | 9.2 | | 40.9 | +7.1 |
| | | | 1/24 | | |
| 12.5 | 52.8 | 9.0 | | 43.4 | +9.4 |
| | | | 1/20 | | |
| 14.5 | 56.8 | 8.8 | | 41.5 | 11.3 |
| | | | 1/17 | | |
| 16.5 | 60.2 | 8.6 | | 47.3 | 12.9 |
| | | | 1/14 | | |
| 18.4 | 63.0 | 8.4 | | 48.8 | 14.2 |
| | | | 1/11.5 | | |
| 20.3 | 65.3 | 8.2 | | 50.05 | 15.25 |
| | | | 1/8.5 | | |
| 22.2 | 67.0 | 8.0 | | 51.0 | 16.0 |
| | | | 1/7.6 | | |
| 27.0 | 70.8 | 7.5 | | 53.15 | 17.65 |
| | | | 1/6.2 | | |

TABLE I-continued

| | | MIRROR B 36% PLANAR | | |
|---|---|---|---|---|
| Feet to Rear (9' out) | Degrees Object Angle (OA) | Degrees* Image Angle (IA) | Mag. Ratio $\frac{\Delta IA}{\Delta OA}$ M | Degrees* Angle of Incidence Reflection | Degrees*** Tangent Angle |
| 31.5 | 73.9 | 7.0 | | 54.95 | 18.95 |
| | | | 1/5.6 | | |
| 39.6 | 76.7 | 6.5 | | 56.6 | 20.1 |
| | | | 1/4.6 | | |
| 46.5 | 79.0 | 6.0 | | 58.0 | 21.0 |
| | | | 1/5.6 | | |
| 63.0 | 81.8 | 5.5 | | 59.65 | 22.15 |
| | | | 1/5.4 | | |
| 96.0 | 84.5 | 5.0 | | 61.25 | 23.25 |
| | | | 1/4.4 | | |
| 139 | 86.3 | 4.5 | | 62.4 | 23.9 |
| | | | 1/2.6 | | |
| 215 | 87.6 | 4.0 | | 63.3 | 24.3 |
| | | | 1/1.8 | | |
| 344 | 88.5 | 3.5 | | 64.0 | 24.5 |
| | | | 1 | | |
| 516 | 89.0 | 3.0 | | 64.5 | 24.5 |
| | | | 1 | | |
| 1031 | 89.5 | 2.5 | | 65.0 | 24.5 |
| | | | 1 | | |
| ∞ | 90.0 | 2.0 | | 65.5 | 24.5 |

*Numbers 1 to 10 used for simplification
Actually 10.0 = 33.0 and 2.0 = 41.0
**Angle of Incidence and Reflection = $\frac{OA + IA}{2}$
***Tangent Angle = OA − Angle of Incidence and Reflection

TABLE II

| | | | MIRROR C 54% PLANAR | | | |
|---|---|---|---|---|---|---|
| Feet to Rear (9' out) | Degrees Object Angle (OA) | Degrees Image Angle (IA) | Mag. Ratio $\frac{\Delta IA}{\Delta OA}$ M | Degrees* Angle of Incidence Reflection | Degrees Tangent Angle | ($\Delta T$) |
| 3 | 18.0 | 10.0 | | 25.5 | −7.5 | |
| | | | 1/183 | | | 5.47 |
| 5 | 29.0 | 9.94 | | 31.03 | −2.03 | |
| | | | 1/131 | | | 5.21 |
| 7.5 | 39.5 | 9.86 | | 36.32 | +3.18 | |
| | | | 1/106 | | | 4.21 |
| 10.0 | 48.0 | 9.78 | | 40.61 | +7.39 | |
| | | | 1/100 | | | 2.97 |
| 12.5 | 54.0 | 9.71 | | 43.64 | +10.36 | |
| | | | 1/55 | | | 2.45 |
| 15.0 | 59.0 | 9.62 | | 46.19 | +12.81 | |
| | | | 1/50 | | | 1.72 |
| 17.5 | 62.5 | 9.55 | | 47.97 | +14.53 | |
| | | | 1/37.5 | | | 1.46 |
| 20.0 | 65.5 | 9.47 | | 49.51 | +15.99 | |
| | | | 1/26 | | | 1.91 |
| 25.0 | 69.4 | 9.32 | | 51.54 | +17.86 | |
| | | | 1/22.5 | | | 1.72 |
| 30.0 | 73.0 | 9.16 | | 53.42 | +19.58 | |
| | | | 1/16 | | | 1.13 |
| 35.0 | 75.4 | 9.01 | | 54.69 | +20.71 | |
| | | | 1/12 | | | .87 |
| 40.0 | 77.3 | 8.85 | | 55.72 | +21.58 | |
| | | | 1/9.3 | | | .62 |
| 45.0 | 78.7 | 8.70 | | 56.5 | +22.20 | |
| | | | 1/6.25 | | | .40 |
| 50.0 | 79.7 | 8.54 | | 57.08 | +22.62 | |
| | | | 1/5.67 | | | .70 |
| 60.0 | 81.4 | 8.24 | | 58.08 | +23.32 | |
| | | | 1/3.96 | | | .71 |
| 75.0 | 83.3 | 7.76 | | 59.27 | +24.03 | |
| | | | 1/1.83 | | | .35 |
| 100.0 | 84.84 | 6.92 | | 60.46 | +24.38 | |
| | | | 1/1.43 | | | .16 |
| 125.0 | 85.87 | 6.20 | | 61.33 | +24.44 | |
| | | | | | | .04 |
| 150.0 | 86.56 | 5.44 | | 62.06 | +24.50 | |
| 200.0 | 87.42 | 4.58 | 1 | 62.92 | +24.50 | 0 |
| 300.0 | 88.28 | 3.72 | 1 | 63.78 | +24.50 | 0 |

TABLE II-continued

MIRROR C 54% PLANAR

| Feet to Rear (9' out) | Degrees Object Angle (OA) | Degrees Image Angle (IA) | Mag. Ratio ΔIA/ΔOA M | Degrees* Angle of Incidence Reflection | Degrees Tangent Angle | (ΔT) |
|---|---|---|---|---|---|---|
| 400.0 | 88.71 | 3.29 | 1 | 64.21 | +24.50 | 0 |
| 500.0 | 88.97 | 3.03 | 1 | 64.47 | +24.50 | 0 |
|  |  |  | 1 |  |  | 0 |

*Actually 10.0 = 33.0 and 2.0 = 41.0
**Angle of Incidence and reflection = $\frac{OA + IA}{2}$
***Tangent Angle = OA − Angle of Incidence and Reflection.

TABLE III

MIRROR A 0% PLANAR

| Degrees Feet to Rear (9' out) | Degrees Object Angle (OA) | Ratio Image Angle (IA) | Mag.* Degrees ΔIA/ΔOA M | Angle of Incidence Reflection | Degrees Tangent Angle |
|---|---|---|---|---|---|
| 3 | 17.5 | 10.0 |  | 25.25 | −7.75 |
|  |  |  | 1/57.5 |  |  |
| 5 | 29.0 | 9.8 |  | 31.1 | −2.1 |
|  |  |  | 1/31.9 |  |  |
| 10 | 47.5 | 9.22 |  | 40.6 | +6.9 |
|  |  |  | 1/22.1 |  |  |
| 15 | 59.0 | 8.7 |  | 46.6 | +12.4 |
|  |  |  | 1/13 |  |  |
| 20 | 65.5 | 8.2 |  | 50.1 | +15.4 |
|  |  |  | 1/7.8 |  |  |
| 25 | 69.4 | 7.7 |  | 52.3 | +17.1 |
|  |  |  | 1/6.8 |  |  |
| 30 | 73.0 | 7.17 |  | 54.4 | +18.6 |
|  |  |  | 1/6 |  |  |
| 35 | 75.4 | 6.77 |  | 55.8 | +19.6 |
|  |  |  | 1/5.1 |  |  |
| 40 | 77.3 | 6.4 |  | 56.9 | +20.4 |
|  |  |  | 1/6.4 |  |  |
| 45 | 78.7 | 6.18 |  | 57.8 | +20.9 |
|  |  |  | 1/3.6 |  |  |
| 50 | 79.7 | 5.9 |  | 58.4 | +21.3 |
|  |  |  | 1/4.25 |  |  |
| 60 | 81.4 | 5.5 |  | 59.4 | +22.0 |
|  |  |  | 1/3.8 |  |  |
| 75 | 83.3 | 5.0 |  | 60.6 | +22.7 |
|  |  |  | 1/3.1 |  |  |
| 100 | 84.84 | 4.5 |  | 61.7 | +23.1 |
|  |  |  | 1/2.6 |  |  |

TABLE III-continued

MIRROR A 0% PLANAR

| Degrees Feet to Rear (9' out) | Degrees Object Angle (OA) | Ratio Image Angle (IA) | Mag.* Degrees ΔIA/ΔOA M | Angle of Incidence Reflection | Degrees Tangent Angle |
|---|---|---|---|---|---|
| 200 | 87.4 | 3.48 |  | 63.5 | +23.9 |
|  |  |  | 1/1.8 |  |  |
| 300 | 88.28 | 3.0 |  | 64.1 | +24.2 |
|  |  |  | 1/2.1 |  |  |
| 400 | 88.71 | 2.8 |  | 64.4 | +24.3 |
|  |  |  | 1/2.6 |  |  |
| 500 | 88.97 | 2.7 |  | 64.6 | +24.4 |

*See footnotes for Tables I and II

TABLE IV

OBJECT ANGLES OF APPROACHING VEHICLE
(Based on Mini-car 12 ft. long, 6 ft. wide and 5 ft. high)

| Distance of Vehicle Front Behind Driver Mirror (Feet) | Horizontal Angles* | | | Vertical Angles** | | |
|---|---|---|---|---|---|---|
|  | 3 Feet Out and 12 Feet Back (Deg) | 9 Feet Out (Deg) | 12 Feet Out (Deg) | 2 Feet Down (Deg) | 4.5 Feet Down (Deg) | 7 Feet Down (Deg) |
| 3 | 78.5 | 17.5 | 14.0 | 33.5 | 56.0 | 67.0 |
| 5 | 79.75 | 29.0 | 22.5 | 22.0 | 42.0 | 54.5 |
| 7.5 | 81 | 39.5 | 31.5 | 15.0 | 31.0 | 43.0 |
| 10 | 82 | 48.0 | 40.0 | 11.5 | 23.0 | 35.0 |
| 15 | 83.5 | 59.0 | 51.5 | 7.64 | 17.0 | 25.0 |
| 20 | 84.75 | 65.5 | 59.0 | 5.73 | 12.5 | 19.5 |
| 25 | 85.6 | 69.4 | 64.0 | 4.58 | 10.3 | 15.5 |
| 30 | 86.05 | 73.0 | 68.0 | 3.82 | 8.5 | 13.2 |
| 35 | 86.4 | 75.4 | 71.0 | 3.27 | 7.3 | 11.4 |
| 40 | 86.95 | 77.3 | 73.0 | 2.86 | 6.5 | 10.0 |
| 45 | 87.03 | 78.7 | 75.0 | 2.55 | 5.7 | 8.9 |
| 50 | 87.3 | 79.7 | 76.5 | 2.29 | 5.2 | 7.9 |
| 75 | 88.0 | 83.3 | 80.8 | 1.53 | 3.44 | 5.35 |
| 100 | 88.47 | 84.84 | 83.12 | 1.15 | 2.57 | 4.01 |
| 125 | 88.74 | 85.87 | 84.5 | 0.92 | 2.06 | 3.21 |
| 150 | 88.94 | 86.56 | 85.4 | 0.76 | 1.72 | 2.67 |
| 200 | 89.19 | 87.42 | 86.57 | 0.57 | 1.29 | 2.01 |
| 300 | 89.45 | 88.28 | 87.71 | 0.38 | 0.86 | 1.34 |
| 400 | 89.58 | 88.71 | 88.28 | 0.29 | 0.64 | 1.00 |
| 500 | 89.66 | 88.97 | 88.63 | 0.23 | 0.52 | 0.80 |

*Angle to line normal to vehicles motion
**Angle to horizontal line

TABLE V

OBJECT AND IMAGE ANGLES FOR MIRRORS B AND C

| Distance of Vehicle Front Behind Driver's Mirror (Feet) | MIRROR B | | | | | MIRROR C | | | | |
|---|---|---|---|---|---|---|---|---|---|---|
|  | 9 Ft. Out | | 12 Ft. Back | | | 9 Ft. Out | | 12 Ft. Back | | |
|  | OA | IA | OA | IA | ΔIA | OA | IA | OA | IA | ΔIA |
| 3 | 17.5 | 10.0 | 78.5 | 6.13 | 3.87 | 17.5 | 10.0 | 78.5 | 8.72 | 1.28 |
| 5 | 29.0 | 9.8 | 79.75 | 5.9 | 3.9 | 29.0 | 9.94 | 79.75 | 8.54 | 1.40 |
| 7.5 | 39.5 | 9.53 | 81.0 | 5.65 | 3.88 | 39.5 | 9.86 | 81.0 | 8.32 | 1.54 |
| 10 | 48.0 | 9.25 | 82.0 | 5.47 | 3.78 | 48.0 | 9.78 | 82.0 | 8.12 | 1.66 |
| 15 | 59.0 | 8.73 | 83.5 | 5.25 | 3.48 | 59.0 | 9.62 | 83.5 | 7.65 | 1.97 |
| 20 | 65.5 | 8.2 | 84.75 | 4.95 | 3.25 | 65.5 | 9.47 | 84.75 | 7.01 | 2.47 |
| 25 | 69.4 | 7.67 | 85.6 | 4.71 | 2.96 | 69.4 | 9.32 | 85.6 | 6.47 | 2.85 |
| 30 | 73.0 | 7.15 | 86.05 | 4.57 | 2.58 | 73.0 | 9.16 | 86.05 | 6.09 | 3.07 |
| 35 | 75.4 | 6.75 | 86.4 | 4.49 | 2.26 | 75.4 | 9.01 | 86.4 | 5.75 | 3.26 |
| 40 | 77.3 | 6.4 | 86.95 | 4.27 | 2.13 | 77.3 | 8.85 | 86.95 | 5.10 | 3.75 |
| 45 | 78.7 | 6.08 | 87.03 | 4.2 | 1.88 | 78.7 | 8.70 | 87.03 | 4.95 | 3.75 |
| 50 | 79.7 | 5.9 | 87.3 | 4.1 | 1.8 | 79.7 | 8.54 | 87.3 | 4.75 | 3.79 |
| 75 | 83.3 | 5.3 | 88.0 | 3.77 | 1.53 | 83.3 | 7.76 | 88.0 | 4.0 | 3.76 |
| 100 | 84.84 | 4.95 | 88.47 | 3.5 | 1.45 | 84.84 | 6.92 | 88.47 | 3.53 | 3.39 |
| 125 | 85.87 | 4.7 | 88.74 | 3.3 | 1.4 | 85.87 | 6.20 | 88.74 | 3.26 | 2.94 |
| 150 | 86.56 | 4.47 | 88.94 | 3.05 | 1.42 | 86.56 | 5.44 | 88.94 | 3.06 | 2.38 |
| 200 | 87.42 | 4.1 | 89.19 | 2.81 | 1.29 | 87.42 | 4.58 | 89.19 | 2.81 | 1.77 |
| 300 | 88.28 | 3.67 | 89.45 | 2.55 | 1.12 | 88.28 | 3.72 | 89.45 | 2.55 | 1.22 |
| 400 | 88.71 | 3.29 | 89.58 | 2.42 | 0.87 | 88.71 | 3.29 | 89.58 | 2.42 | 0.87 |

TABLE V-continued
OBJECT AND IMAGE ANGLES FOR MIRRORS B AND C

| Distance of Vehicle Front Behind Driver's Mirror (Feet) | MIRROR B | | | | | MIRROR C | | | | |
|---|---|---|---|---|---|---|---|---|---|---|
| | 9 Ft. Out | | 12 Ft. Back | | | 9 Ft. Out | | 12 Ft. Back | | |
| | OA | IA | OA | IA | ΔIA | OA | IA | OA | IA | ΔIA |
| 500 | 88.97 | 3.03 | 89.66 | 2.34 | 0.67 | 88.97 | 3.03 | 89.66 | 2.34 | 0.69 |

Note that Table I shows the data developed for the trailing vehicle which is 12 feet long and 6 feet wide and which is 3 feet to one side of the mirror (embodiment B). The specific point on this vehicle measured is at the left front fender which is actually 9' from the mirror (the 3' spacing plus the 6' width of the vehicle). There are 6 columns in Table I. The first column sets forth the various positions of the trailing vehicle in feet, the second and third columns set forth the object and image angles at these positions, the image angle being converted to a 0° to 10° span. The fourth column shows its magnification ratio. The fifth column illustrates the angle of incidence "i" and angle of reflection "r" shown in FIG. 4. The next adjacent column lists the tangent angles of the tangent lines illustrated in FIG. 4, specifically that angle T formed between the tangent and plane P3 in FIG. 4.

Tables II and III give similar information for a second and third embodiment which are illustrated in FIGS. 9a and 9b as Mirror A and Mirror C.

Having described the overall mirror assembly and specific embodiments thereof, it is to be understood that these assemblies can vary in size and position relative to an observation point or to the object being viewed and yet can be readily designed to include the various features recited above, based on the teachings herein. For example, the assembly could be located on the opposite side of vehicle 10, as stated. The mirrored surface can be larger than the surface described previously and segments 24a and 24b can vary in size relative to one another. These are of course only examples of the changes which can be provided so long as these changes are compatible with the features of the present invention described previously.

The foregoing has been a description of a rear view mirror assembly including a mirrored surface, specifically surface 24, which is planar in vertical section. While the mirror described provides a view directly behind the vehicle supporting the assembly unless it is very large vertically and/or relatively close to the ground, it does not provide view of the driver's rear-view tires (on the mirror mounted side). More important, when the assembly is utilized in a conventional position on a relatively large vehicle, as stated, it does not provide a view of smaller vehicles as the latter pass, as will be best seen in FIG. 12. In order to overcome these problems, a rear view mirror assembly generally designated by the reference numeral 20' in FIG. 10 may be provided. This assembly includes a mirror surface 24' which may be identical to previously described surface 24 in horizontal section and hence may be divided into two segments 24a' and 24b'. The segment 24a' corresponds to the horizontally curved segment 24a and segment 24b' corresponds to the planar segment 24b. However, as illustrated best in FIG. 11 in conjunction with FIG. 10, mirrored surface 24' is not entirely planar in vertical section but is slightly curved along a bottom edge portion 30 and may also be curved along a top edge portion 32. Each vertical curve may extend along the entire length of each edge section or only along portions thereof depending upon the field of view desired. As will be seen from the graphic illustrations and tables to follow, these curves provide the same type of linear relationship discussed with respect to the horizontal curvatures.

Turning specifically to FIG. 12, mirror 20' is shown mounted to a typical large truck 34 at a point 7 feet above the ground and, while no shown, it is mounted 34 inches from the driver's eye (the observation point). In the embodiment illustrated, the mirror is 16 inches high from its bottom edge to its top edge. It has been found that if this assembly were entirely planar vertically it would provide the vertical field of view indicated by the dotted field of view lines V1 and V2. Note that each of these field of view lines extends at an angle of approximately 13° with the horizontal. Also note that it does not include any part of a compact vehicle generally indicated by the box (dotted) at 36 when the latter is located in the position shown, that is, to one side of the mirrored assembly and 3 feet back therefrom. In addition, if the back of the truck is higher than that shown, for example, 10.5 feet from the ground, as illustrated by dotted lines, the front edge would not be seen at all. However, assembly 20' is not planar vertically in its entirety, but rather includes previously recited curve section 30 and 32. Vertically curved section 30 increases the field of view downward to 67° from the horizontal (as compared to 13°) as seen by view line VI' and it also increases the field of view upwards to 42°, from the horizontal (as compared to 13°) as seen by view line V2'. Thus, it can be seen from FIG. 12 that an object 5' high such as the front of vehicle 36 begins disappearing from the driver's view in a planar mirror (at ground level) at a distance of 30 feet back from the assembly. From 30 feet to 9 feet back the view becomes more and more limited until at 9 feet, the smaller vehicle leaves the view entirely. However, utilizing mirrored surface 24', the rear view mirror assembly will continue to show a full frontal view of the smaller vehicle until its front edge is 3 feet back from the mirror assembly and even the smaller vehicle passes this point, much of its body will still be in view. Note also that the rear tires (on the same side of the assembly) can now be seen where they could not with the planar mirror, of course unless the tires were more than 30 feet back from the mirror assembly. It should also be noted that mirrored surface 24' can readily show the top of vehicle 24 at a point 3 feet back up to a height of 10.5 feet. This view is often very important to the driver of a high vehicle that is passing under a low object such as a wire, branch, a tunnel or a bridge member.

The assembly just described was designed to give a straight-line relationship between the distance back of the trailing vehicle and vertical position of its image. To more fully appreciate this, FIGS. 13 and 14 are graphic illustrations of object angle (VOA) and image angle (VIA), respectively, as a function of distance for half of mirrored surface 24' including bottom curve 30 and are based on Table VI below. The lower half of an actual vertical section of this part of the mirror is shown in FIG. 15. The centerline is horizontally aligned with the driver eye (observation point).

TABLE VI

MIRROR 20' 51.5% PLANAR VERTICALLY

| Feet to Rear (9' out) | Degrees Object Angle (OA) | Degrees Image Angle (IA) | Mag. Ratio $\frac{\Delta IA}{\Delta OA}$ M | Degrees Angle of Incidence Reflection* | Degrees** Tangent Angle ($\Delta T$) |
|---|---|---|---|---|---|
| 3 | 67.0 | 13.0 | | 40.0 | 27.0 |
| | | | 1/125 | | 6.2 |
| 5 | 54.5 | 12.9 | | 33.7 | 20.8 |
| | | | 1/27 | | 4.1 |
| 7 | 45.0 | 12.55 | | 28.8 | 16.7 |
| | | | 1/29 | | 5.3 |
| 10 | 35.0 | 12.2 | | 23.6 | 11.4 |
| | | | 1/18 | | 3.7 |
| 15 | 25.0 | 11.65 | | 18.3 | 6.7 |
| | | | 1/14 | | 1.6 |
| 18 | 21.5 | 11.4 | | 16.4 | 5.1 |
| | | | 1/7 | | 2.2 |
| 23.3 | 16.5 | 10.72 | | 13.6 | 2.9 |
| | | | 1/4.8 | | 1.2 |
| 29.2 | 13.5 | 10.05 | | 11.8 | 1.7 |
| | | | 1/3.3 | | 0.8 |
| 36 | 11.0 | 9.28 | | 10.1 | 0.9 |
| | | | 1/2.3 | | 0.3 |
| 40 | 10.0 | 8.8 | | 9.4 | 0.6 |
| | | | 1/1.9 | | 0.2 |
| 45 | 9.0 | 8.27 | | 8.6 | 0.4 |
| | | | 1/2.3 | | 0.4 |
| 50 | 7.7 | 7.7 | | 7.7 | 0 |
| | | | 1 | | 0 |
| 60 | 6.5 | 6.5 | | 6.5 | 0 |
| | | | 1 | | 0 |
| 70 | 5.7 | 5.7 | | 5.7 | 0 |
| | | | 1 | | 0 |
| 80 | 5.0 | 5.0 | | 5.0 | 0 |
| | | | 1 | | 0 |
| 90 | 4.45 | 4.45 | | 4.45 | 0 |
| | | | 1 | | 0 |
| 100 | 4.0 | 4.0 | | 4.0 | 0 |
| | | | 1 | | 0 |
| 125 | 3.2 | 3.2 | | 3.2 | 0 |
| | | | 1 | | 0 |
| 150 | 2.7 | 2.7 | | 2.7 | 0 |
| | | | 1 | | 0 |
| 200 | 2.0 | 2.0 | | 2.0 | 0 |
| | | | 1 | | 0 |
| 300 | 1.3 | 1.3 | | 1.3 | 0 |
| | | | 1 | | 0 |
| 400 | 1.0 | 1.0 | | 1.0 | 0 |
| | | | 1 | | 0 |
| 500 | 0.8 | 0.8 | | 0.8 | 0 |

*Angle of Incidence & Reflection = $\frac{VOA + VIA}{2}$

**Tangent Angle = VOA − Angle of Incidence & Reflection

It should be noted that approximately 50% (actually 51.1%) of the vertical section illustrated is planar and that the curved section provided the straight-line relationship discussed above but only for a certain distance back. This is best illustrated in FIG. 14, where this straight-line relationship is represented by the segment L3' comprising part of the curve L3. Curve L3 represents the vertical image angle as a function of distance at a point on the approaching vehicle 7 feet down, that is, at the bottom of the approaching vehicle and the second curve L4 provides the same graphic illustration at the top of the approaching vehicle, that is, at a point 2 feet down from the assembly. Note that at a distance back of about 50 feet or less, curve segment 30 offers an image of the bottom extremities which follows a straight line down to 3 feet back.

It is to be understood that the particular mirror 20' (as well as 20) are provided for exemplary purposes only and not to limit the invention. The mirrored surfaces of the present invention are ones which can be provided with the horizontal curvature discussed previously in conjunction with the vertical curvature at its bottom edge and it may or may not include a vertical curvature at its top edge or, as discussed initially, the mirrored surface may not be curved at all vertically. In this regard it should be apparent from the respective discussion of horizontal and of vertical image relationships, that in a mirror which is to "see" up and down as well as sideways at near objects, that there will be portions of such a mirror, that is towards the outer corners, where curvature will be required both vertically and horizontally. This will mean that lower right and/or upper left portions of such a mirror will be rounded in such a way that a given point on the mirror will reflect an image to the O.P. that enables observation corresponding to both types of curvature discussed herein.

In view of the foregoing it should be apparent that the mirrored surfaces previously described can consist of a single planar surface section (horizontally and/or vertically) and a single curved section (horizontally and/or vertically) which meets the afore described linear relationship. However, as also described previously, a third curved section (horizontally and/or vertically) can be provided intermediate the first two sections. This intermediate section would provide a smooth transition between the first two sections and accordingly would not necessarily follow the linear relationships described previously or any other linear relationship.

What is claimed is:

1. A rear view mirror assembly, comprising:
   (a) a mounting structure adapted for connection to one side of a first vehicle in a fixed position relative to a predetermined observation point within the vehicle;
   (b) a mirrored surface supported by said mounting structure for viewing a second vehicle from said observation point when said first vehicle is in a given lane, said second vehicle being in a next adjacent lane along a substantially straight path behind said mirrored surface; and
   (c) said mirrored surface including a segment which is curved in any horizontal plane therethrough, the horizontal curvature of said segment defining cooperating object and image angles associated with each point along its horizontal extent with respect to said observation point, said angles being selected so as to result in a predesigned continuous decrease in the magnification ratio of and along the entire extent of said curvature in the direction away from said observation point, said predesigned decrease in magnification ratio defining a linear relationship between
      (i) the horizontal position of the image on the mirrored surface segment of a particular point on a forward portion of said second vehicle as viewed from said observation point when said second vehicle is located along said path within a predetermined range of distances from said mirrored surface segment, and
      (ii) the distance back from said mirrored surface of said second vehicle along said path, whereby said image point moves horizontally across said surface segment at a speed substantially linearly proportionate to the speed of said second vehicle relative to said first vehicle as said second vehicle moves along said path within said range.

2. An assembly according to claim 1 wherein said predesigned decrease in magnification ratio causes the horizontal image width of said second vehicle on said segment as viewed from said observation point to increase in size horizontally as the distance back of said second vehicle from said mirrored surface decreases to about 10 feet, said increase in horizontal image width being approximately linearly related to distance from the mirror of said second vehicle when said second vehicle is within said predetermined range.

3. An assembly according to claim 1 wherein said predetermined range is from about 50 feet from said mirrored surface to about 10 feet.

4. An assembly according to claim 1 wherein said range of distances is from about 30 feet from said surface segment to about 3 feet.

5. An assembly according to claim 1 wherein said mirrored surface segment is substantially straight in any vertical plane therethrough.

6. An assembly according to claim 1 wherein said mirrored surface includes a second segment horizontally to one side of said first-mentioned curved segment, said second segment being substantially straight in any horizontal plane therethrough.

7. An assembly according to claim 1 wherein said mirrored surface includes at least one horizontally extending segment including a bottom edge portion which is curved in any vertical plane therethrough so that at least a portion of said last-mentioned segment defines a substantially linear relationship between the position of said particular point on said second vehicle when the latter is located along said path within a predetermined range of distances from the mirrored surface segment, and the vertical position of the image of said point on said edge portion as viewed from said observation point; whereby said image moves vertically across said edge portion at a speed substantially linearly proportionate to the speed of said second vehicle relative to said first vehicle as said second vehicle moves along said last-mentioned path within said range.

8. An assembly according to claim 2 wherein said mirrored surface includes a horizontally extending section having a top portion including a segment which is curved in any vertical plane therethrough for providing a view of an obstruction which is about three feet back of said mirror and about 10.5 feet above the ground.

9. An assembly according to claim 1 wherein said magnification ratio decreases from a value of 1 to a lowermost value not less than about 1/100.

10. An assembly according to claim 9 wherein said lowermost value is not less than about 1/60.

11. An assembly according to claim 1 wherein said mirrored surface includes a horizontally extending section having a bottom edge portion which is curved in the vertical plane therethrough for viewing said second vehicle along a section of said path within a predetermined range of distance from said bottom edge portion, and having a magnification ratio which continuously decreases from the upper horizontal side of the bottom edge portion to the lower horizontal side thereof.

12. An assembly according to claim 6 wherein said mirrored surface includes a third segment located horizontally intermediate said first and second segments, said third segment being curved but not having said predesigned decrease in magnification ratio, said third segment providing an intermediate smooth transition between said first and second segments.

13. An assembly according to claim 12 wherein said mirrored surface consists essentially of said firstmentioned curved segment, said second straight segment, and said third intermediate segment the horizontal extent of said straight segment comprising approximately 36% of the entire horizontal extent of said mirrored surface.

14. An assembly according to claim 12 wherein said second straight mirrored segment is located between said curved segments and said first vehicle when said mounting structure is in said fixed position, said segments together providing a rearward view which, in a horizontal plane through said segments, extends from said mirrored surface to a forwardmost point at an angle of about 15°-20° rearward of a line normal to said path and through said mirrored surface and a rearwardmost point about 92°-95° from said normal line.

15. An assembly according to claim 14 wherein said forwardmost point is between about 17.5° rearwardly of said line and said rearwardmost point is about 92° therefrom.

16. An assembly according to claim 14 wherein said mirrored surface has a horizontal extent of about 5 to 8 inches.

17. An assembly according to claim 16 wherein said horizontal extent is about 7 inches.

18. A rear view mirror assembly, comprising:
(a) a mounting structure adapted for connection to one side of a first vehicle in a fixed position relative to a predetermined observation point within the vehicle;
(b) a mirrored surface supported by said mounting structure for viewing a second vehicle from said observation point when said first vehicle is in a given lane, said second vehicle being in a next adjacent lane along a substantially straight path behind said mirrored surface; and
(c) said mirrored surface including a segment which is curved in any horizontal plane therethrough, the horizontal curvature of said segment defining cooperating object and image angles associated with each point along its horizontal extent with respect to said observation point, said angles being selected so as to result in a predesigned continuous decrease in the magnification ratio of and along the entire extent of said curvature in the direction away from said observation point, said predesigned decrease in magnification ratio
  (i) causing the horizontal image width of said second vehicle on said segment as viewed from said observation point to increase in size horizontally as the distance back of said second vehicle from said mirrored surface decreases to about 10 feet, and
  (ii) defining a linear relationship between the horizontal position of the image on said curved mirrored surface segment of a particular point on a forward portion of said second vehicle as viewed from said observation point when said second vehicle is located along said path within a predetermined range of distance from said mirrored surface segment, and the distance back from said mirrored surface of said second vehicle along said path, whereby said image point moves horizontally across said surface segment at a speed substantially linearly proportionate to the speed of said second vehicle relative to said first vehicle as said second vehicle moves along said path within said range.

19. An assembly according to claim 18 wherein said mirrored surface includes at least one horizontally extending segment including a bottom edge portion which is curved in any vertical plane therethrough.

20. An assembly according to claim 18 wherein said mirrored surface consists essentially of said first and second segments and wherein said first planar segment comprises at least about 20% of the total horizontal extent of said mirrored surface.

21. An assembly according to claim 18 wherein the image of the outermost point on the front end of said second vehicle is fully visible on said mirrored surface from said observation point when said outermost point is a distance 12 feet laterally of said mirrored surface and five feet back therefrom.

22. An assembly according to claim 20 wherein said curved segment comprises about 64% of the entire horizontal extent of said mirrored surface.

23. An assembly according to claim 20 wherein said first segment is planar in any vertical plane therethrough.

24. An assembly according to claim 21 wherein said last-named image is seen from the observation point at approximately the outer edge of the mirror when said outermost point is at said distance.

25. An assembly according to claim 18 wherein said mirrored surface includes a horizontally extending section having a bottom edge portion which is curved in the vertical plane therethrough for viewing said second vehicle along a section of said path within a predetermined range of distance from said bottom edge portion, and having a magnification ratio which continuously decreases from the upper horizontal side of the bottom edge portion to the lower horizontal side thereof.

26. An assembly according to claim 18 wherein said mirrored surface includes a horizontally extended section having a top portion including a segment which is curved in any vertical plane therethrough for providing a view of an obstruction which is about three feet back of said mirror and about 10.5 feet above the ground.

27. A rear view mirror assembly, comprising:
    (a) a mounting structure adapted for connection to one side of a first vehicle in a fixed position relative to a predetermined observation point within the vehicle;
    (b) a mirrored surface supported by said mounting structure for viewing a second vehicle from said observation point when said first vehicle is in a given lane, said second vehicle being in a next adjacent lane along a substantially straight path behind said mirrored surface; and
    (c) said mirrored surface including a segment which is curved in any vertical plane therethrough, the vertical curvature of said segment defining cooperating object and image angles associated with each point along its horizontal extent with respect to said observation point, said angles being selected so as to result in a predesigned continuous decrease in the magnification ratio of and along the entire extent of said curvature in the direction away from said observation point, said predesigned decrease in magnification ratio
        (i) causing vertical image width of said second vehicle on said segment as viewed from said observation point to increase in size vertically as the distance back of said second vehicle from said mirrored surface decreases to about 10 feet, and
        (ii) defining a linear relationship between the vertical position of the image on said curved mirrored surface segment of a particular point on a forward portion of said second vehicle as viewed from said observation point when said second vehicle is located along said path within a predetermined range of distances from said mirrored surface segment, and the distance back from said mirrored surface of said second vehicle along said path, whereby said image point moves vertically across said surface segment at a speed substantially linearly proportionate to the speed of said second vehicle relative to said first vehicle as said second vehicle moves along said path within said range.

28. A rear view mirror assembly, comprising:
    (a) a mounting structure adapted for connection to one side of a first vehicle in a fixed position relative to a predetermined observation point within the vehicle;
    (b) a mirrored surface supported by said mounting structure for viewing a second vehicle from said observation point when said first vehicle is in a given lane, said second vehicle being in a next adjacent lane along a substantially straight path behind said mirrored surface; and
    (c) said mirrored surface including a first segment which is planar in any horizontal plane therethrough and a second adjacent segment which is further from said observation point than said first segment and which is curved in any horizontal plane therethrough, the horizontal curvature of said second segment defining cooperating object and image angles associated with each point along its horizontal extent with respect to said observation point, said angles being selected so as to result in a predesigned continuous decrease in the magnification ratio of and along the entire extent of said curvature in the direction away from said observation point, said predesigned decrease in magnification ratio
        (i) causing the horizontal image width of said second vehicle on said second surface segment as viewed from said observation point to increase in size horizontally as the distance back of said second vehicle from said mirrored surface decreases to about 10 feet, and
        (ii) defining a linear relationship between the horizontal position of the image on said second segment of a particular point on a forward portion of said second vehicle as viewed from said observation point when said second vehicle is located along said path within a predetermined range of distances from said mirrored surface, and the distance back from said mirrored surface of said second vehicle along said path, whereby said image point moves horizontally across said surface segment at a speed substantially linearly proportionate to the speed of said second vehicle relative to said first vehicle as said second vehicle moves along said path within said range.

* * * * *